United States Patent
Affentranger, Jr. et al.

(10) Patent No.: US 12,463,580 B2
(45) Date of Patent: Nov. 4, 2025

(54) MOUNT AND CLAMP ASSEMBLIES

(71) Applicant: Sunrun Inc., San Francisco, CA (US)

(72) Inventors: Martin John Affentranger, Jr., Paso Robles, CA (US); William Stanley Arbuckle, Paso Robles, CA (US); Brian David Peterson, Santa Cruz, CA (US); Andrew John Wickham, Santa Margaritz, CA (US); Ezra Jason Phillips, Cayucos, CA (US)

(73) Assignee: Sunrun Inc., San Francisco, CA (US)

( * ) Notice: Subject to any disclaimer, the term of this patent is extended or adjusted under 35 U.S.C. 154(b) by 136 days.

(21) Appl. No.: 18/202,545

(22) Filed: May 26, 2023

(65) Prior Publication Data
US 2024/0022205 A1 Jan. 18, 2024

Related U.S. Application Data

(60) Provisional application No. 63/389,618, filed on Jul. 15, 2022.

(51) Int. Cl.
*H02S 20/23* (2014.01)
(52) U.S. Cl.
CPC .................. *H02S 20/23* (2014.12)
(58) Field of Classification Search
CPC ...................................................... H02S 20/23
See application file for complete search history.

(56) References Cited

U.S. PATENT DOCUMENTS

| | | | | |
|---|---|---|---|---|
| 7,435,134 B2 * | 10/2008 | Lenox | ...................... | F24S 25/20 |
| | | | | 52/173.3 |
| 8,647,009 B2 * | 2/2014 | Kobayashi | .............. | F24S 25/61 |
| | | | | 52/173.3 |
| 8,839,575 B1 * | 9/2014 | Liu | ........................ | F24S 25/613 |
| | | | | 52/173.3 |
| 8,935,893 B2 * | 1/2015 | Liu | ........................ | F24S 25/61 |
| | | | | 52/173.3 |
| 9,166,524 B2 * | 10/2015 | West | ...................... | F24S 25/613 |
| 9,853,595 B1 * | 12/2017 | Okado | .................... | F24S 25/61 |
| 9,985,575 B2 * | 5/2018 | Stearns | ................... | H02S 20/23 |
| 10,601,362 B2 * | 3/2020 | Stephan | .................. | H02S 40/00 |
| 10,951,157 B1 * | 3/2021 | Young | ..................... | H02S 30/10 |
| 10,982,430 B2 | 4/2021 | Meine | | |

(Continued)

*Primary Examiner* — Eret C McNichols
(74) *Attorney, Agent, or Firm* — Herbert Smith Freehills Kramer (US) LLP

(57) ABSTRACT

Mount and clamp assemblies employed in solar power installations are disclosed. In some embodiments, a mount assembly having a rail and opposing wings extending outwardly from the rail is disclosed. Each wing includes a top surface and a bottom surface for creating a chemical flashing, a groove and a sealant-receiving cavity extending away the bottom surface and upwardly into the wing, and a compressible seal with a circumferential pressure relief passageway. In some embodiments, a clamp having an upper member and a lower member with two horizontal flanges and a vertical flange is disclosed; in this embodiment, adjacent modules may be clamped together without an underlying structure mounted directly below to an installation surface. In another embodiment, a fourth flange is included in the mount assembly; in this embodiment, adjacent modules may be clamped together while being mounted directly to an installation surface.

11 Claims, 27 Drawing Sheets

(56) References Cited

U.S. PATENT DOCUMENTS

| | | | |
|---|---|---|---|
| 11,486,134 B2 | 11/2022 | Meine | |
| 11,515,831 B2 * | 11/2022 | Affentranger, Jr. | F16J 15/14 |
| 11,572,690 B2 | 2/2023 | Meine | |
| D987,412 S * | 5/2023 | Meine | D8/349 |
| 12,068,715 B2 * | 8/2024 | Meine | H02S 30/10 |
| 2007/0212935 A1 * | 9/2007 | Lenox | F24S 25/61 |
| | | | 439/567 |
| 2013/0291479 A1 * | 11/2013 | Schaefer | F24S 25/70 |
| | | | 52/745.21 |
| 2015/0060619 A1 * | 3/2015 | Krannich | F24S 25/70 |
| | | | 248/237 |
| 2015/0107168 A1 * | 4/2015 | Kobayashi | H02S 20/23 |
| | | | 52/173.3 |
| 2015/0288320 A1 * | 10/2015 | Stearns | F24S 25/60 |
| | | | 52/173.3 |
| 2016/0268958 A1 * | 9/2016 | Wildes | H02S 20/23 |
| 2017/0063287 A1 * | 3/2017 | Hudson | F24S 25/61 |
| 2018/0238589 A1 * | 8/2018 | Ash | H02S 20/23 |
| 2021/0285596 A1 * | 9/2021 | Affentranger, Jr. | F16M 13/02 |
| 2024/0297609 A1 * | 9/2024 | Gallegos | H02S 20/23 |

* cited by examiner

MOUNT AND CLAMP ASSEMBLIES

CROSS-REFERENCE TO RELATED APPLICATION

This application claims the benefit of U.S. Provisional Patent Application Ser. No. 63/389,618, filed Jul. 15, 2022, which is incorporated by reference herein in its entirety.

BACKGROUND

When an array of solar modules is mounted to an installation surface, mount assemblies are positioned and secured to an installation surface prior to solar modules being mounted or secured to those assemblies. Typically, this requires time to identify and mark the array and the specific surface locations where the mount assemblies will be installed. Once the mount assemblies are mounted to the installation surface, solar modules are then coupled to the mount assemblies.

SUMMARY

Embodiments of the inventive concepts disclosed herein are directed to a mount assembly and clamp which enable a user's ability to secure them to a solar module of an array of solar modules prior to a solar module being positioned on an installation surface. For roof installations, mount assemblies and clamps may be secured to a solar module prior to the module being lifted and placed on the roof surface. This can accelerate and simplify the installation process by securing the solar modules directly to the installation surface, eliminating the time to identify and mark the array and specific surface locations. Safety is also enhanced because, for instance, the labor of coupling mount assemblies to the solar module is shifted from the roof to the ground.

In one aspect, embodiments of the inventive concepts disclosed herein are directed to a mount assembly. The track assembly could include a rail and a pair of opposing wings. The rail could include two pairs of opposing sides, and each of the opposing wings could extend away from one side of the pair of opposing sides. Each wing has a top surface and a bottom surface, a groove and sealant-receiving cavity extending away the bottom surface and upwardly into the wing, and a compressible seal with a circumferential pressure relief passageway. In some embodiments, a cross member extends between the pair of opposing wings to facilitate a coupling of a vertical interface to the rail. In some embodiments, a clamp with a vertical member extending downward from upper and lower clamping surface may be employed to facilitate a coupling of the downwardly-extending vertical member to the vertical interface.

In a further aspect, embodiments of the inventive concepts disclosed herein are directed to a clamp. The mount assembly could include an upper member, a lower member, and a threaded fastener coupling the upper member to the lower member. The upper member could include a cap with an upper clamping surface, where the cap includes a first aperture, two downwardly-extending vertical members, and a horizontal member with a second, centrically aligned aperture, extending between the vertical members. The lower member could include a center with at least three flanges: the first flange extends forwardly from the center and includes a third aperture, the second flange extends upwardly away from the center, and a third flange extends rearwardly from the center and the first flange. In some embodiments, a fourth flange is present to enable the clamp for use with the mount assembly via the vertical interface.

BRIEF DESCRIPTION OF THE DRAWINGS

For a fuller understanding of the inventive embodiments, reference is made to the following description taken in connection with the accompanying drawings in which.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
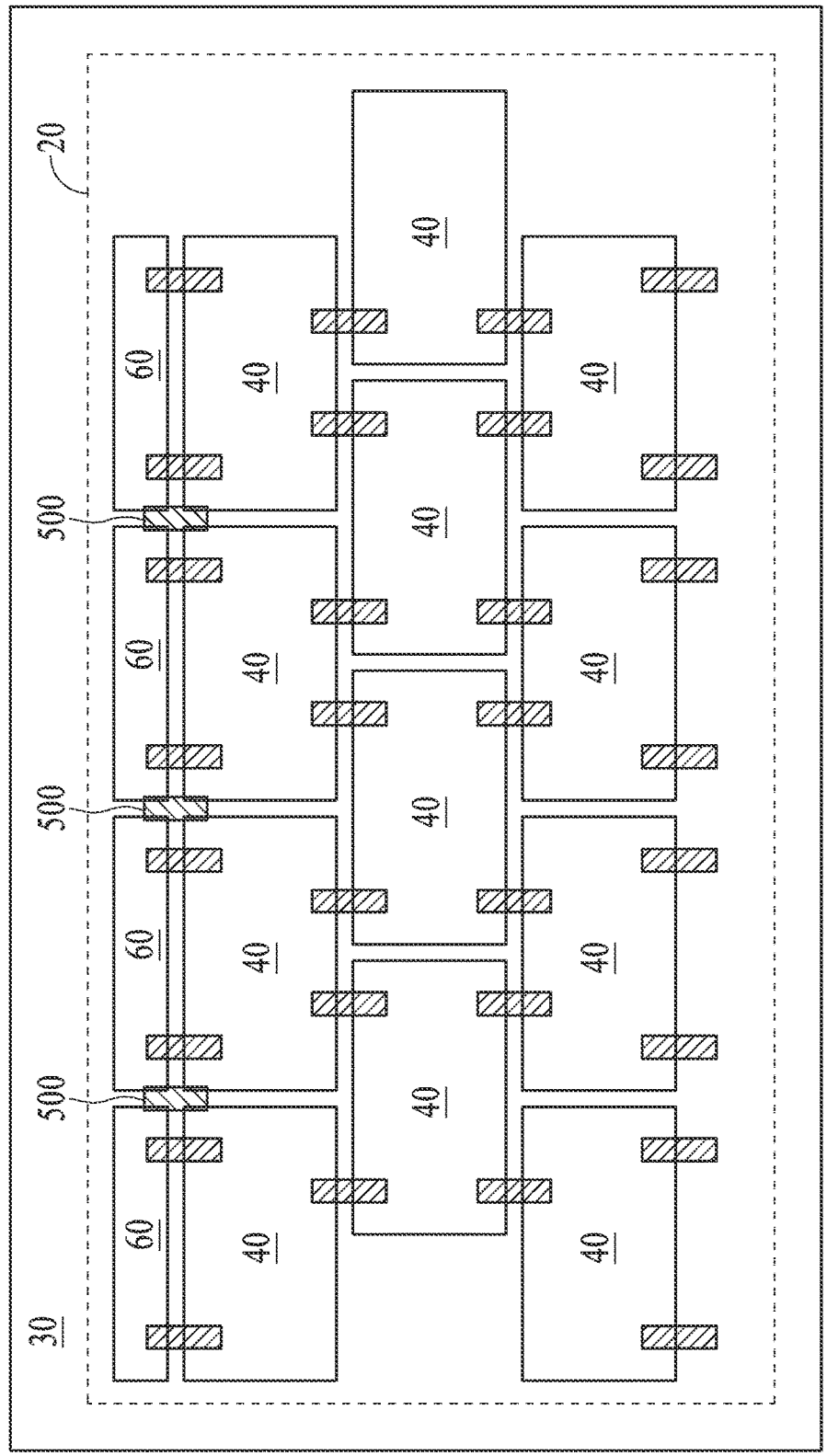
FIG. 1A illustrates a schematic view of solar panel installation system comprising solar modules, skirts, mounts, and clamps, in accordance with some embodiments.

FIG. 1A illustrates a schematic view of solar panel installation system 10 having at least one mount 50 and at least one clamp 500, respectively, in accordance with various embodiments; installation system 10 may include a solar modules array 20 mounted to and above an installation surface 30 with mounts 50, where each solar module 40 may include a module frame supporting a panel comprised of an array of electricity-generating solar cells covered with a protectant material such as, for example, tempered glass or a laminate material. Each module 40 is typically rectangular-shaped structures having four corners and four linear sides, and mounted above installation surface 30. In some embodiments, a skirt(s) 60 may be coupled to an outer row of modules 40 to provide an aesthetically-pleasing view of the solar modules array 20 by shielding mounts 50 and clamps 500 from view.

Figure 1B:
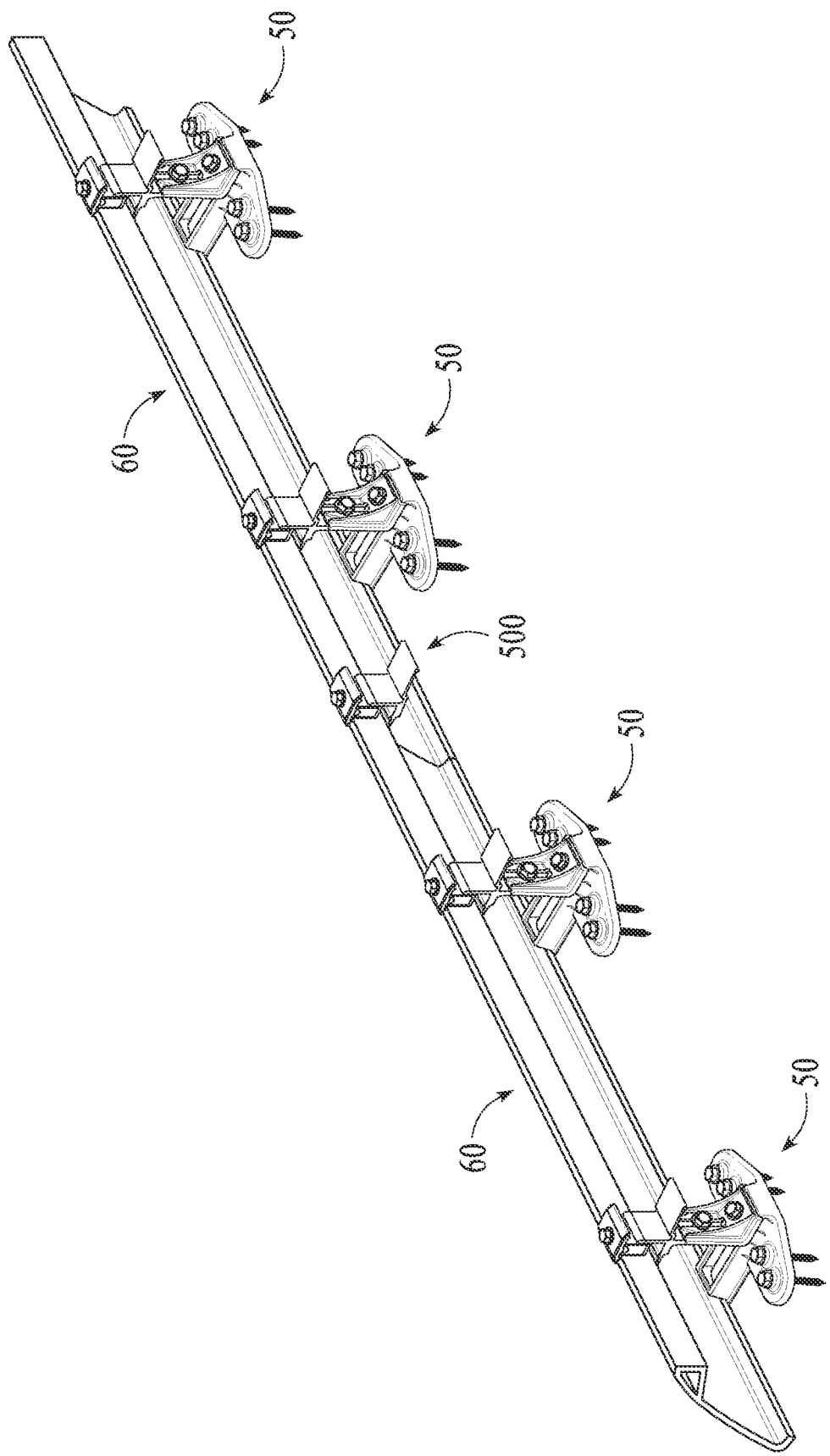
FIG. 1B illustrates a perspective view of the mounts and clamps being employed with skirts, in accordance with some embodiments.
Figure 1C:
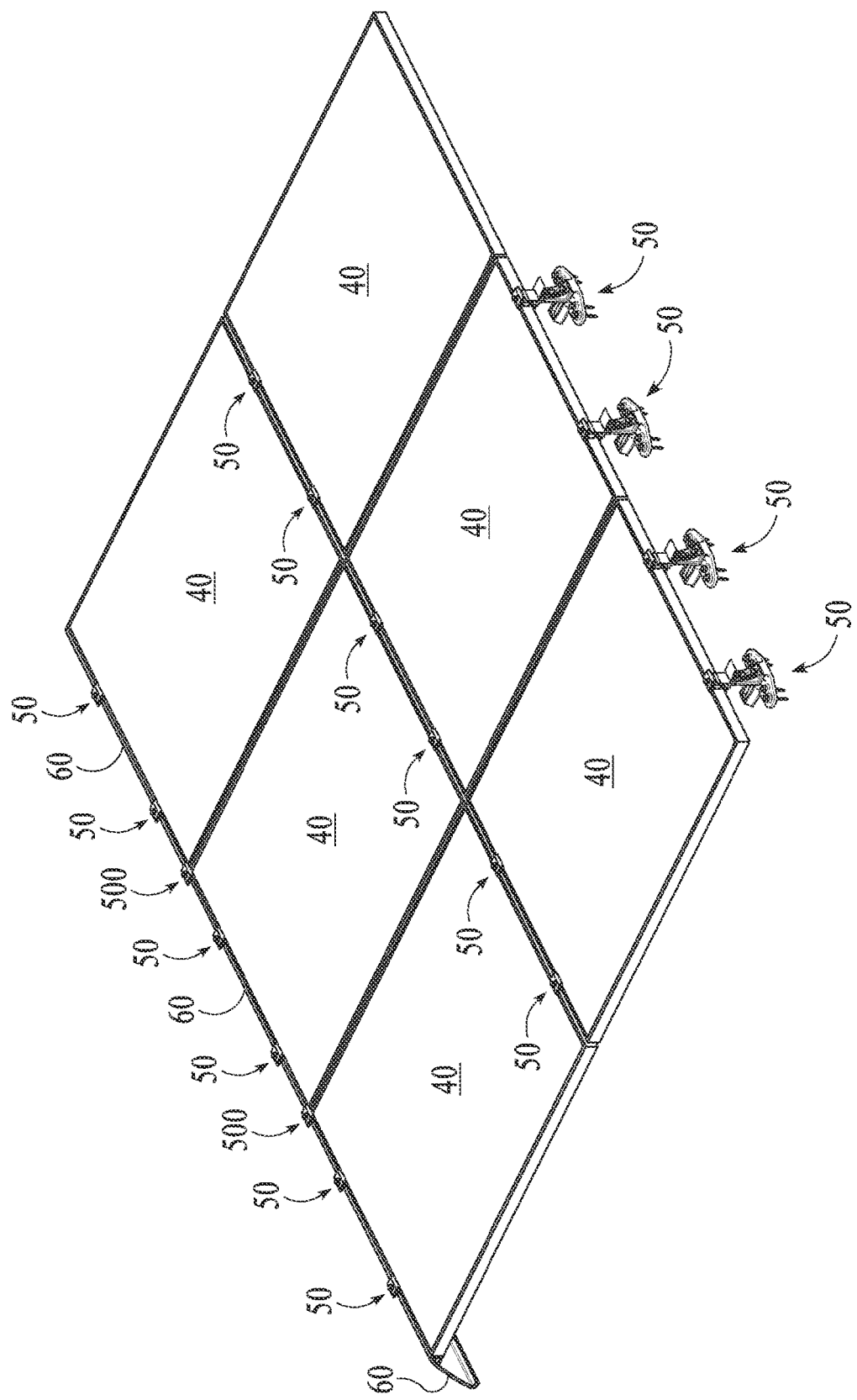
FIGS. 1C and 1D illustrate perspective views of the mounts and clamps being employed in arrays of modules and skirts, in accordance with some embodiments.
Figure 1D:
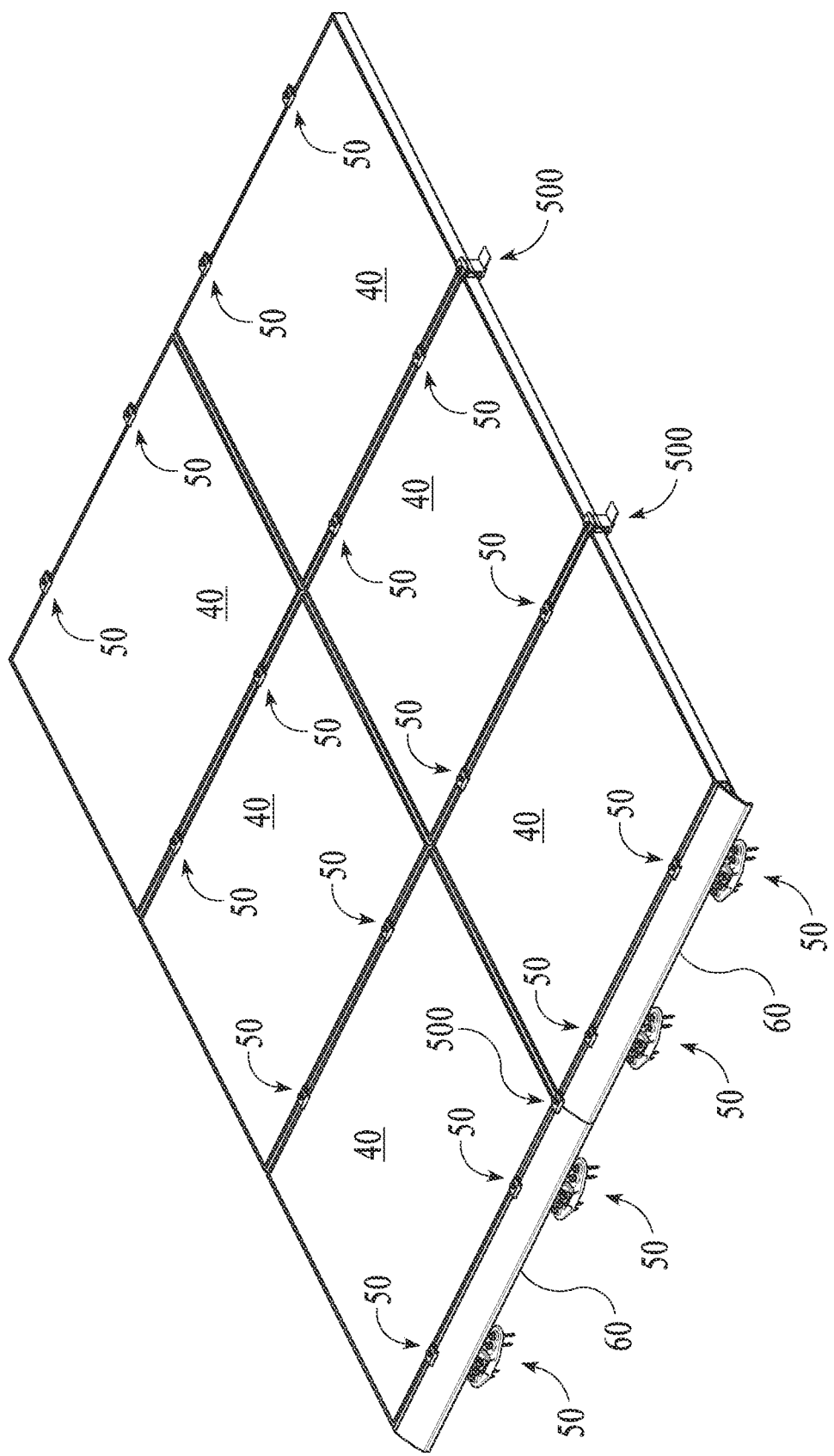
Figure 1F:
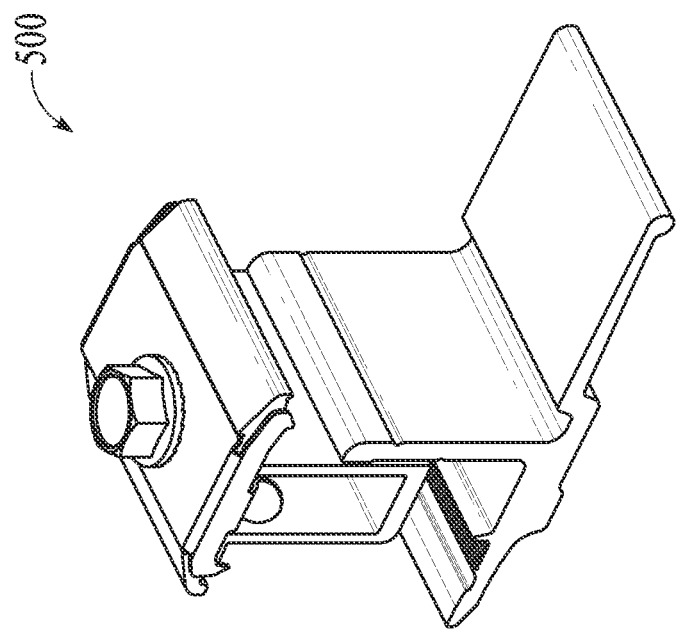
FIGS. 1E and 1F illustrate perspective views of the mount and clamp, in accordance with some embodiments
Figure 1E:
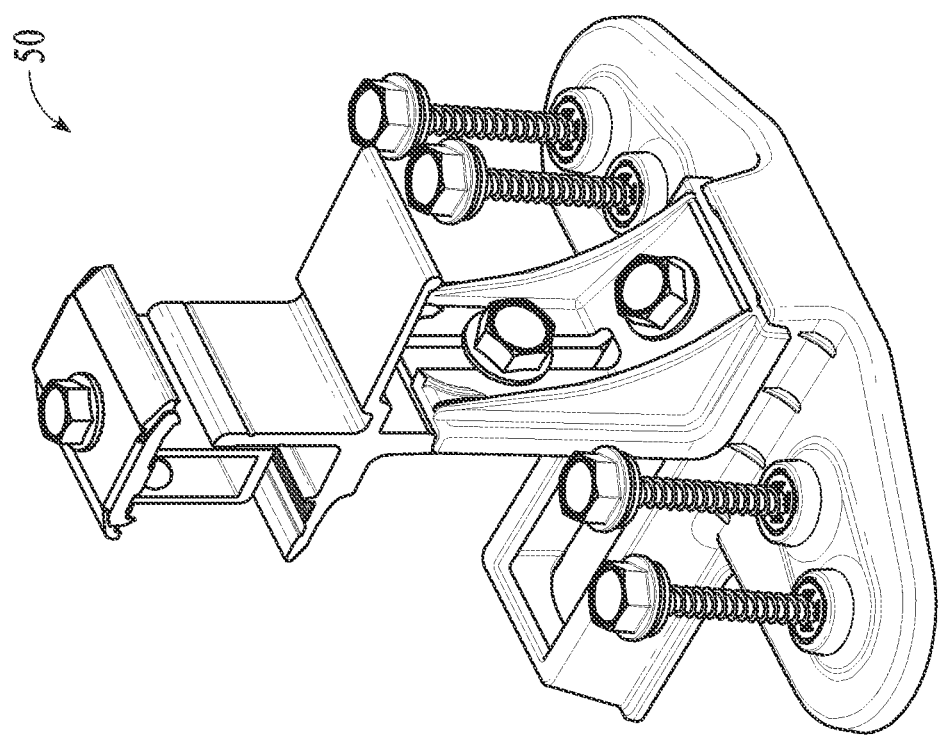

FIG. 1B illustrates a perspective view of mounts 50 and clamps 500 being employed with skirts 60, in accordance with various embodiments; FIGS. 1C and 1D illustrate perspective views of mounts 50 and clamps 500 being employed in solar modules array 20 with both modules 40 and skirts 60, in accordance with various embodiments; and FIGS. 1E and 1F illustrate perspective views of mount 50 and clamp 500, in accordance with various embodiments. In some embodiments, mounts 50 may be employed to mount modules 40 above installation surface, and clamps 500 may be employed to couple adjacent skirts 60 to one another. Although typically rectangular shaped, other shapes are possible and explicitly contemplated for use with the embodiments disclosed herein.

Figure 2A:
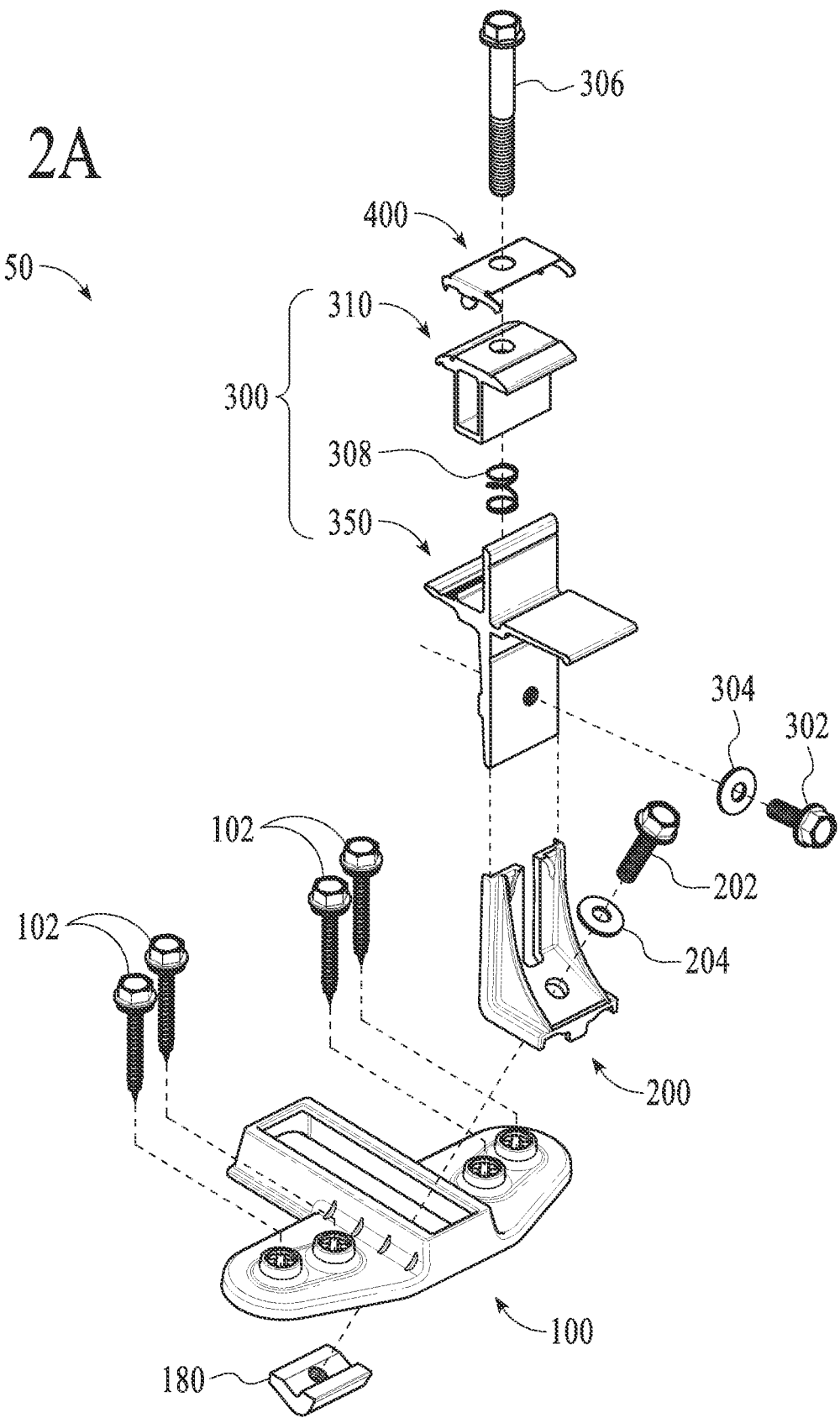
FIG. 2A illustrates an exploded view of the mount, in accordance with some embodiments.
Figure 2B:
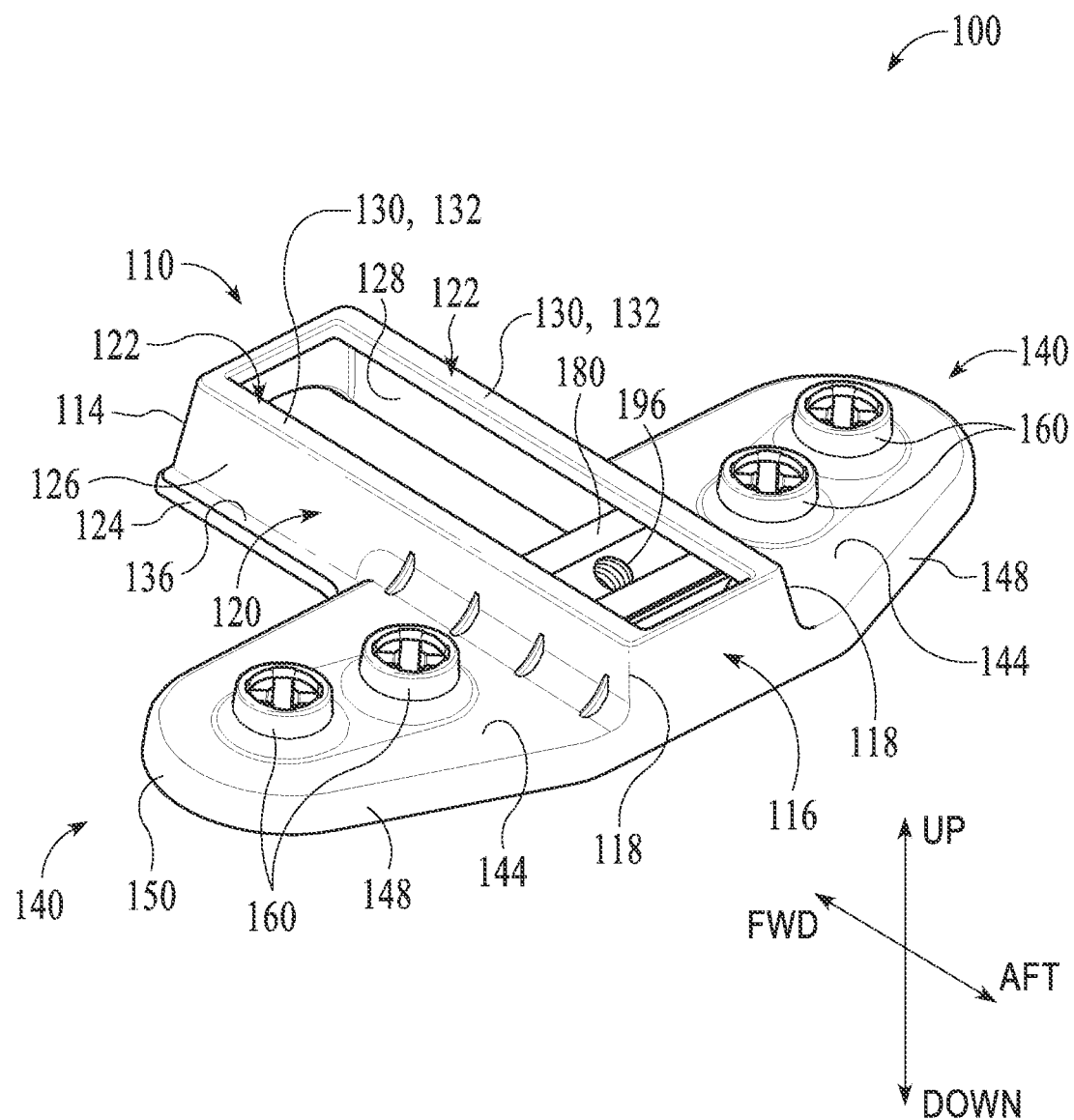
FIGS. 2B-2E illustrate perspective views of a base of the mount, in accordance with some embodiments.
Figure 2C:
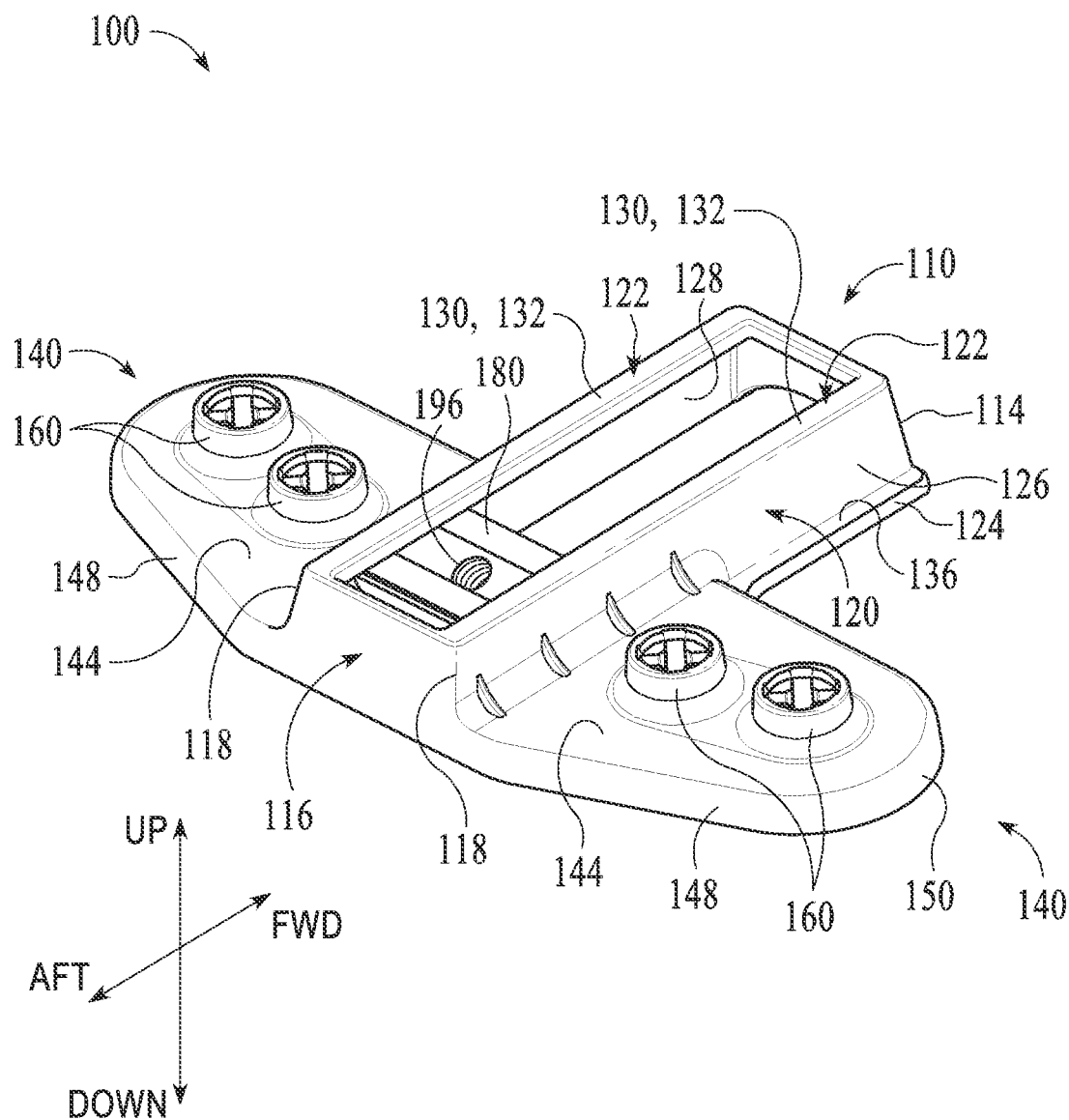
Figure 2D:
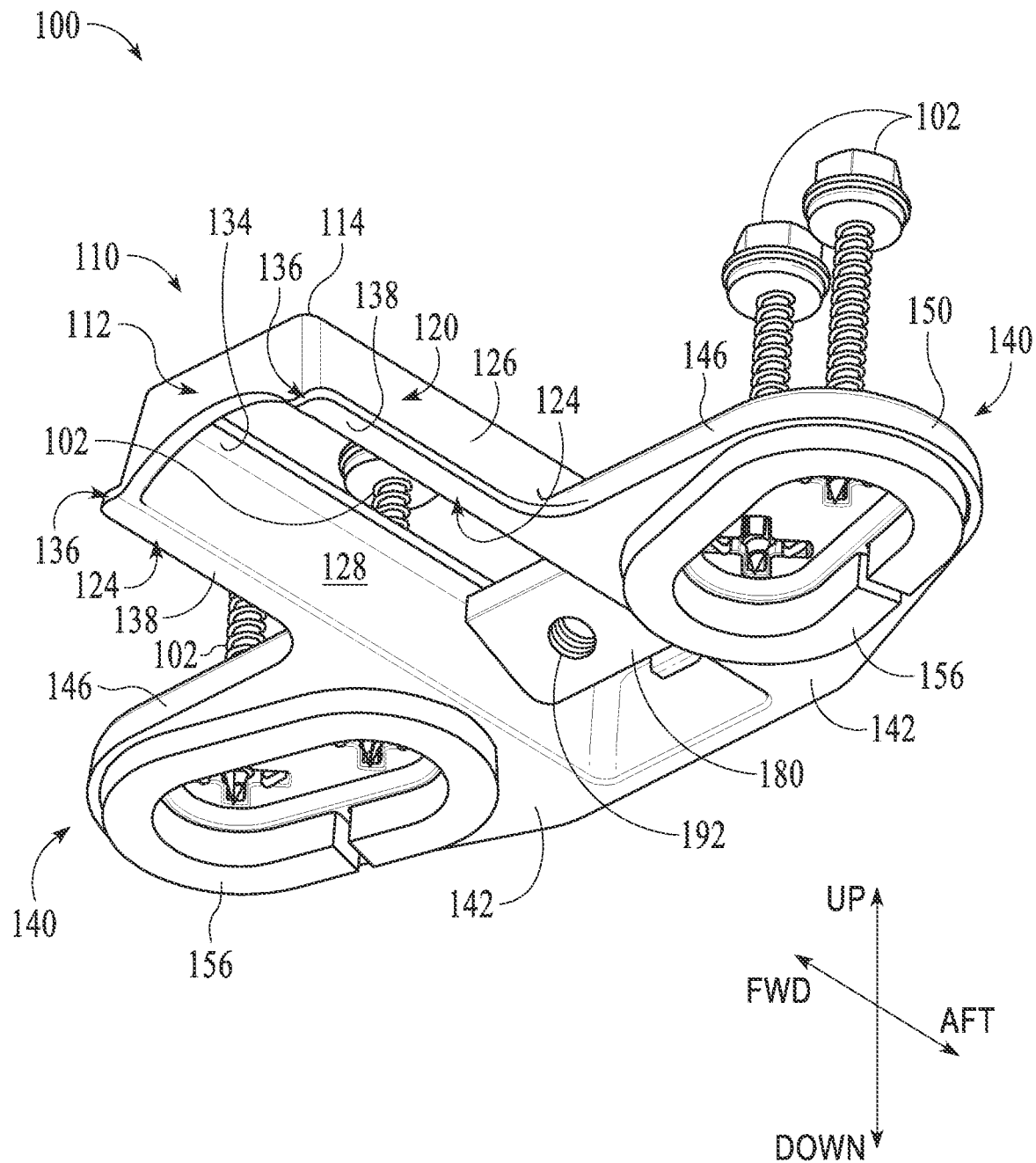
Figure 2E:
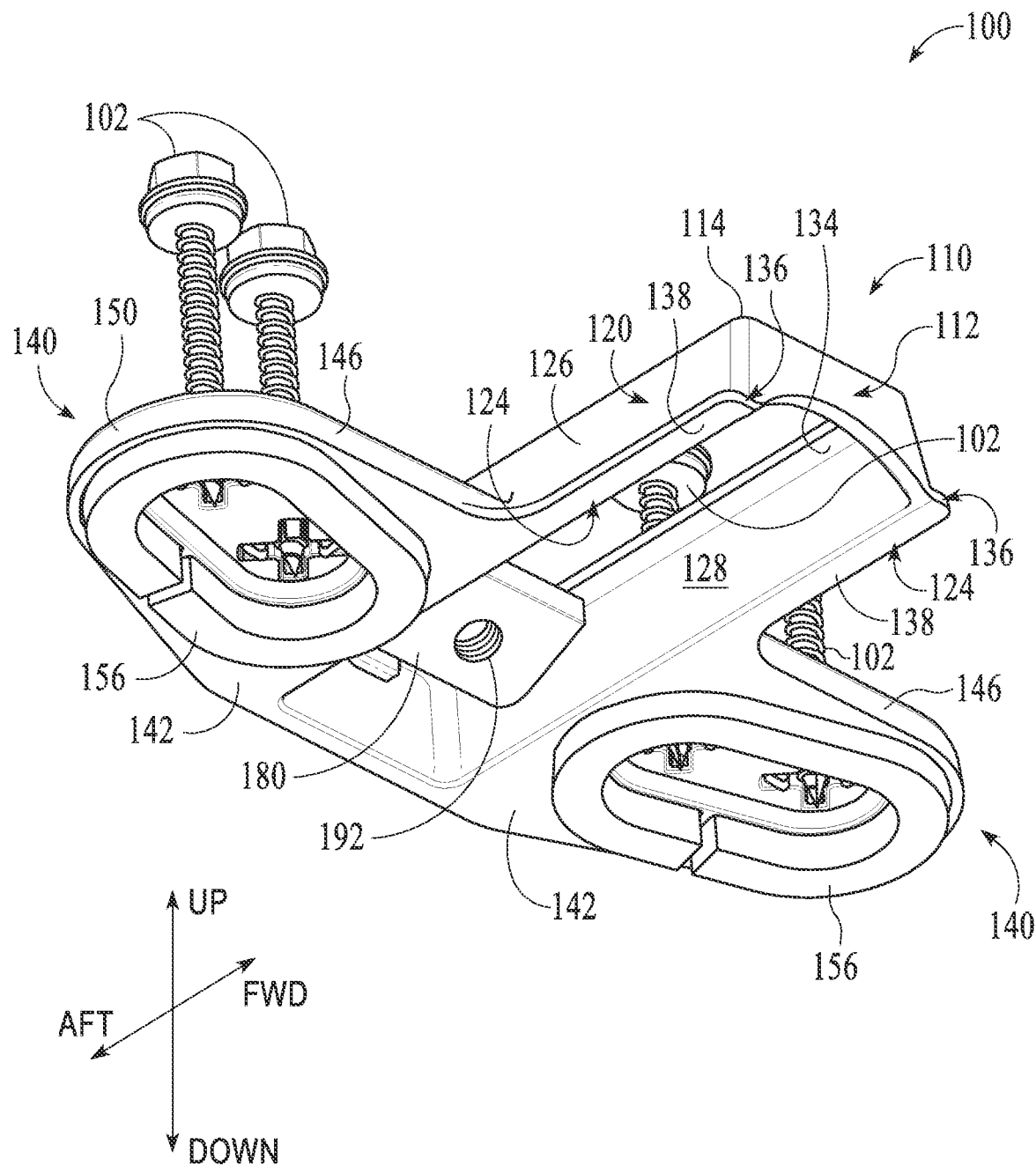

FIG. 2A illustrates an exploded view of mount 50. Mount assembly 50 includes a base 100, a vertical interface 200, and a clamp assembly 300 with an upper member 310 and a lower member 350, and a grounding clip 400. Coupling hardware that may be employed includes fasteners 102 for mounting for securing base 100 to an installation surface 30; a locking nut 180, a fastener 202, and a washer 204 for securing vertical interface 200 to base 100; a fastener 302 and a washer 304 for securing lower member 350 to vertical interface 200; and a fastener 306 and a compression spring 308 for securing upper member 310 to lower member 350 and grounding clip 400 to upper member 350.

Figure 2F:
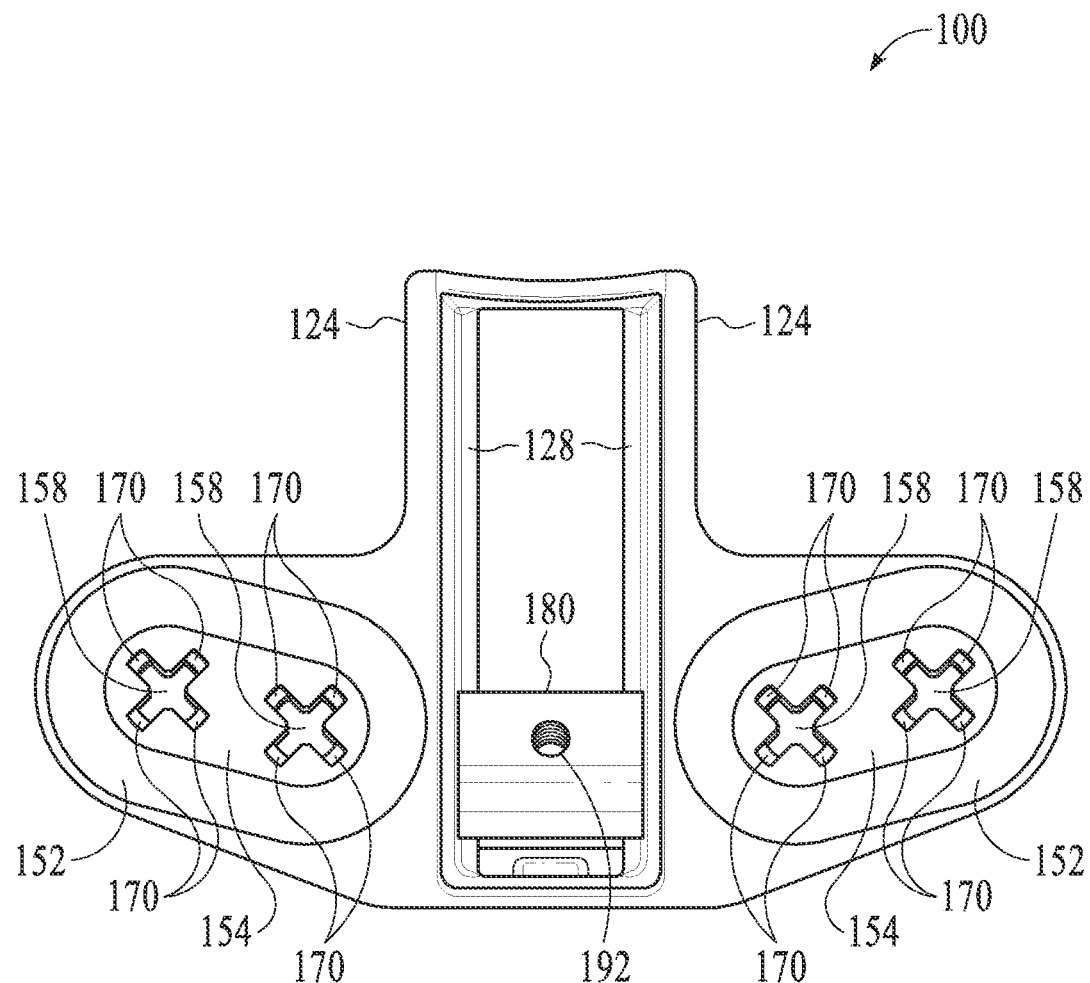
FIG. 2F illustrates a bottom view of the base of the mount, in accordance with some embodiments.

FIGS. 2B-2E illustrate perspective views of base 100 of mount 50, and FIG. 2F illustrates a bottom view of base 100. Base 100 includes a rail 110 and opposing wings 140 extending outwardly from rail 110. Rail 110 include a forward vertical side 112 extending horizontally between forward ends 114, an aft vertical side 116 extending horizontally between aft ends 118, and outer sides 120.

Each outer side 120 extends longitudinally between one forward end 114 and one aft end 118. Each outer side 120 includes an upper side 122, a lower side 124, an outer surface 126, and an inner surface 128. Each upper side 122 may be configured with an inwardly-extending upper flange 130 having upper and lower surfaces 132 and 134, respectively. In some embodiments, upper surface 132 may be configured to facilitate a horizontal slidable engagement between upper flange 130 and a horizontal rail 234 of a vertical interface 200 to enable a user's ability to vary the position of vertical interface 200 along base 100; lower surface 134 may be configured to receive a compressive engagement with locking nut 180 when a tightening force is applied to fastener 202 when vertical interface 200 is secured to base 100. Each lower side 124 may be configured with an outwardly-extending lower flange 136 having a bottom surface 138 which faces installation surface 30 when base 100 is mounted thereto.

Each wing 140 includes a bottom surface 142, a top surface 144, a forward vertical side 146, an aft vertical side 148, and an outer vertical side 150, where bottom surface 142 faces installation surface 30 when base 100 is mounted thereto. In some embodiments, each bottom surface 142 may include includes a groove 152 and a sealant-receiving cavity 154 extending upwardly into its wing 140 from bottom surface 142. Groove 152 is configured to receive a seal 156, and sealant-receiving cavity 154 is configured to receive sealant to form a chemical flashing when base 100 is mounted to installation surface 30. Apertures 158 extends upwardly from sealant-receiving cavity 154 and through wing 140 to receive fasteners 102 used to secure base 100 to installation surface 30. As embodied herein, groove(s) and/or a chemical flashing(s) disclosed by Affentranger, Jr. et al in U.S. Pat. No. 11,142,889 (Affentranger) may be employed herein, a reference which is incorporated herein in its entirety. Although the discussion has been drawn to one sealant-receiving cavity 154 being employed in each wing 140, each wing 140 could employ more than sealant-receiving cavity 154; for instance, there may be one sealant-receiving cavity 154 for each aperture 158.

It should be noted that, although the discussion herein is drawn to chemical flashing, each bottom surface 142 may be substantially flat to facilitate a use of non-chemical flashing known to those skilled in the art such as, for instance, butyl pad or mechanical flashing. It should also be noted that, although the discussion herein is drawn to two apertures 158 per wing 140, a structural design requirement for an installation site may require more than two apertures 158 per wing 140 or only one aperture 158 per wing 140. As such, each wing 140 may be configured with more or less than two apertures 158.

Figure 2G:
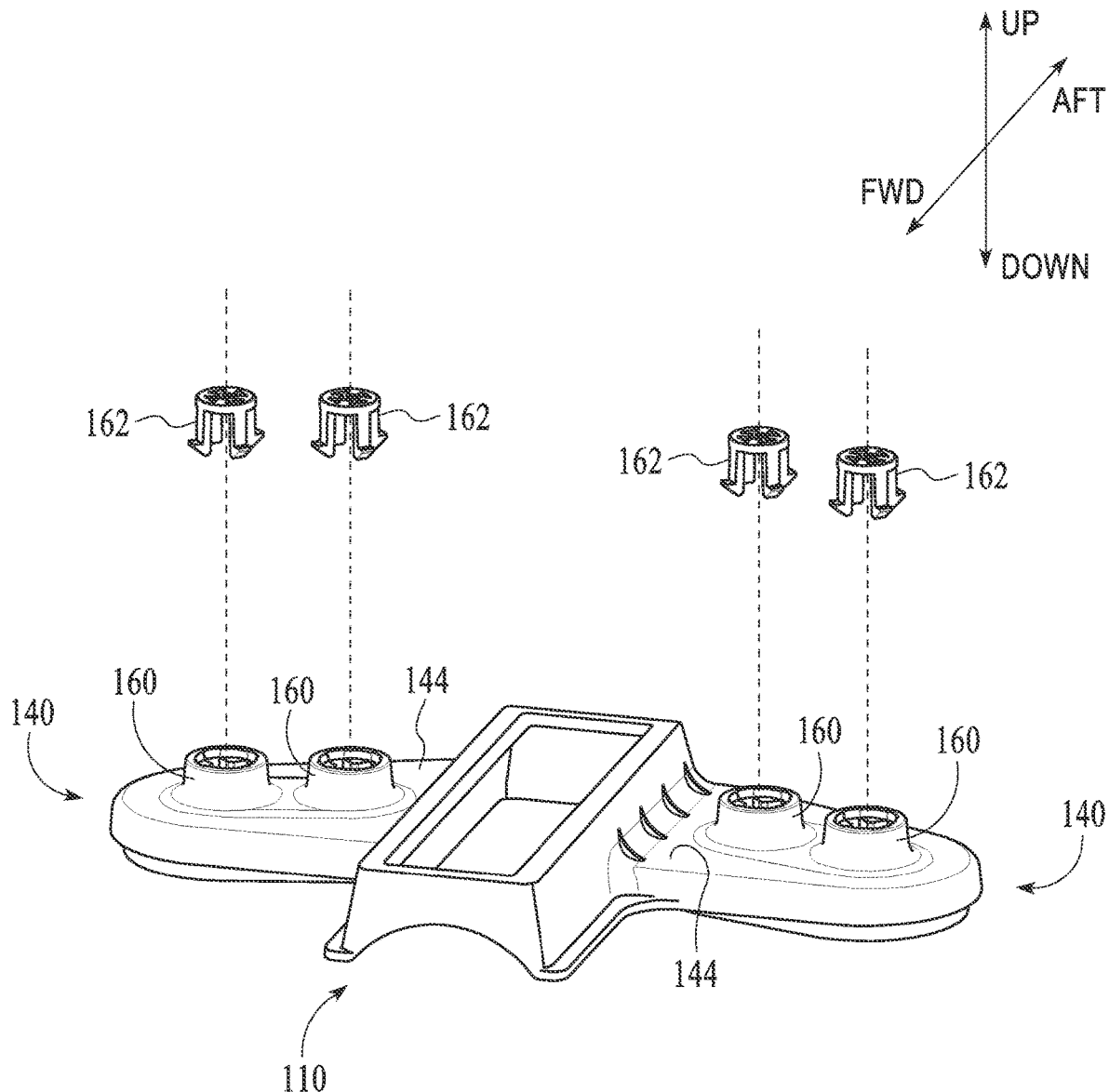
FIG. 2G illustrate an exploded view of the base with fastener retainers, in accordance with some embodiments.
Figure 2H:
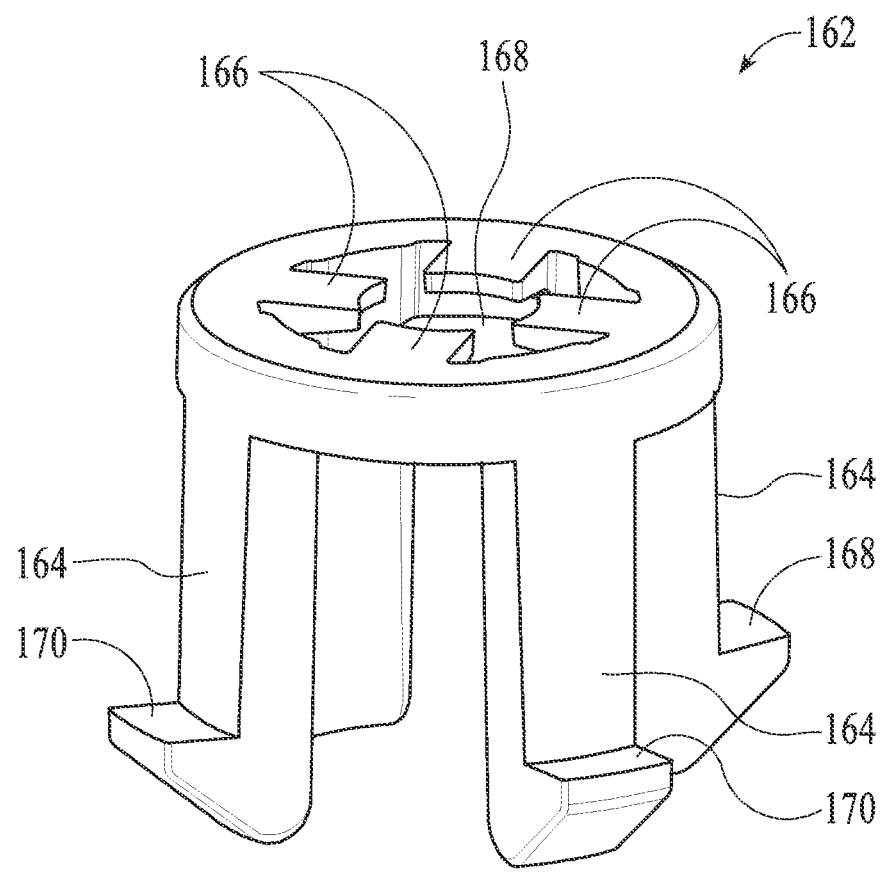
FIG. 2H illustrates a perspective view of a fastener retainer, in accordance with some embodiments.

FIGS. 2G-2H illustrate clip holders 160 extending upwardly from top surface 144 of wings 140 into which a user may insert portable fastener retainer clips 162 into apertures 158 through for the pre-positioning of fasteners 102. Each fastener retainer clip 162 could include a plurality of flexible vertical walls 164 configured to support a plurality of flexible flaps 166 defining an opening 168 and extending to a plurality of outwardly extending flanges 170 at their distal ends. When inserted into apertures 158 through clip holders 160, flanges 170 bend inward to engage an inner surface of aperture 158 as it is pushed downward by the user until flanges 170 exit aperture 158, at which time flanges 170 may snap outwardly to engage the surface defining an exit of aperture 158 into which fastener retainer clips 162 is positioned. As embodied herein, fastener retainers disclosed by Affentranger, Jr. et al in U.S. patent application Ser. No. 18/114,621 filed on Feb. 27, 2023 (Affentranger) may be employed herein, a reference which is incorporated herein in its entirety.

In some embodiments, fasteners 102 may be "pre-positioned" within clip holders 160 and held in place solely by flexible flaps 166 prior to base 100 being positioned for mounting on installation surface 30. In some embodiments, fasteners 102 may be pro-positioned by a manufacturer of the base prior to being placed into the stream of commerce. A user may insert fastener fasteners 102 into opening 168 and apply a tightening force to drive fasteners 102 downwardly so that threads of fasteners 102 will engage flexible flaps 166 to create a frictional and/or threadable engagement between them as distal ends of fasteners 102 are guided by flexible vertical walls 164. Should the tightening force be removed before a tip of fasteners 102 prior to reaching aperture 158, fasteners 102 will remain in a held statically in a substantially vertical position between flexible vertical walls 164 solely by the frictional engagement, thereby allowing a user to pre-position fasteners 102 to avoid having to wait until after base 100 is placed into position on installation surface 30 for mounting thereto.

Figure 2I:
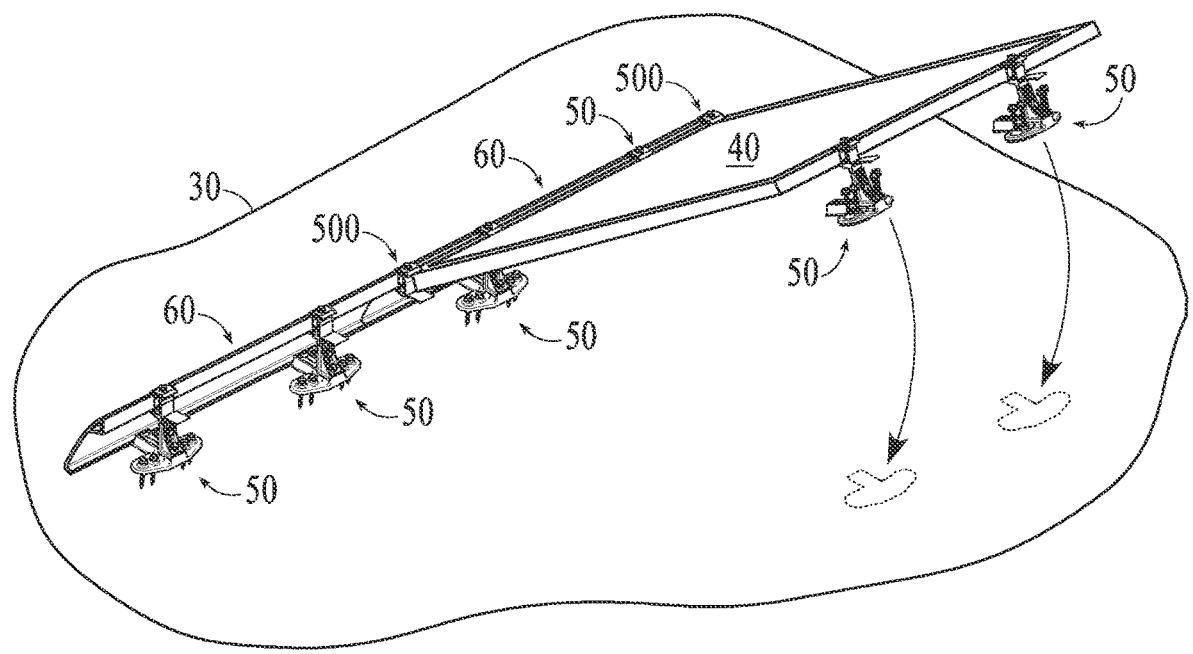
FIGS. 2I-2J illustrate perspective views of an employment of mounts when modules are mounted to the installation surface, in accordance with some embodiments.
Figure 2J:
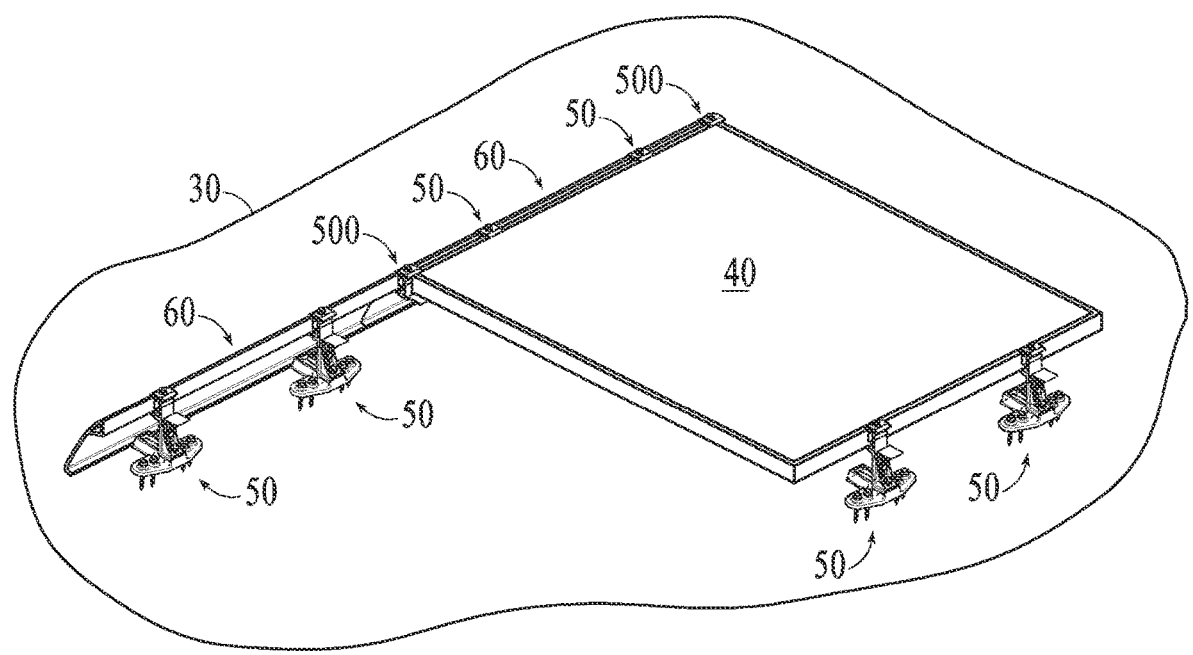

FIGS. 2I-2J illustrate an employment of mounts 50 that have been secured to module 40 prior to mounts 50 being mounted to installation surface 30. By prepositioning fasteners 102 within retainer clips 162 prior to mounts 50 being coupled to module 40, a user does not have to wait until for each mount 50 to be positioned on installation surface 30 before inserting fasteners 102 into or within retainer clips 162; with fasteners being inserted with prepositioning, the user may immediately secure mount 50 to installation surface 30 when it is positioned thereon without having to insert fasteners 102.

Moreover, mounts 50 do not need to be positioned and mounted to installation surface before modules 40 are coupled thereto; rather, mounts 50 may be coupled to module 40 prior to module 40 being lowered into position on installation surface 30 so that both module 40 and mounts 50 may be positioned simultaneously on installation surface 30 as both are simultaneously lowered thereon.

Figure 2K:
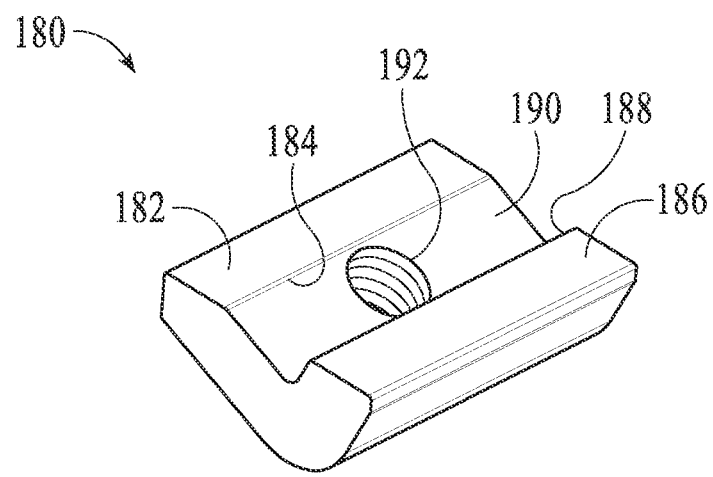
FIGS. 2K-2L illustrate perspective and side views, respectively, of a locking nut of the base of the mount, in accordance with some embodiments.
Figure 2L:
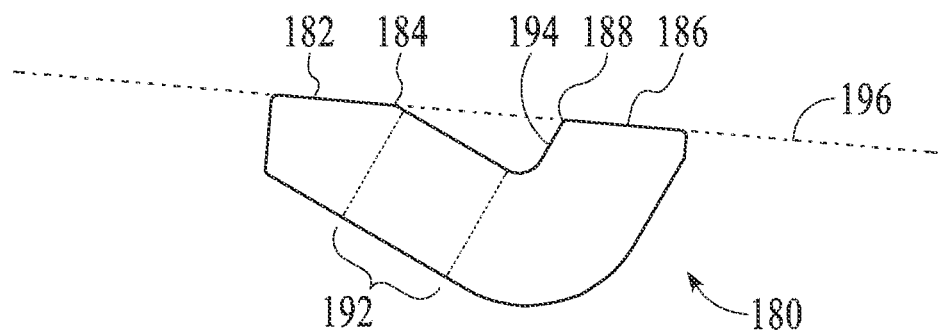

FIGS. 2K-2L illustrate perspective and side views, respectively, of locking nut 180. In some embodiments, base 100 includes a locking nut 180 configured to extend between opposing inner surfaces 128 of rail 100. Locking nut 180 includes a forward horizontal surface 182 with an aft end 184, an aft horizontal surface 186 with a forward end 188, a forward mid surface 190 with aperture 192 and extending downwardly and rearwardly from aft end 184, and an aft mid surface 194 extending downwardly and forwardly from forward end 188 until intersecting with forward mid surface 190. In some embodiments, forward and aft horizontal surface 182 and 186, respectively, may be coplanar 196 with each other to the facilitate the compressive engagement with lower surface 134 of upper flange 130 when vertical interface 200 is secured to base 100 by fastener 202. In some embodiments, aperture 192 and fastener 202 are threaded to threadably engage each other when vertical interface 200 is secured to base 100.

Figure 3A:
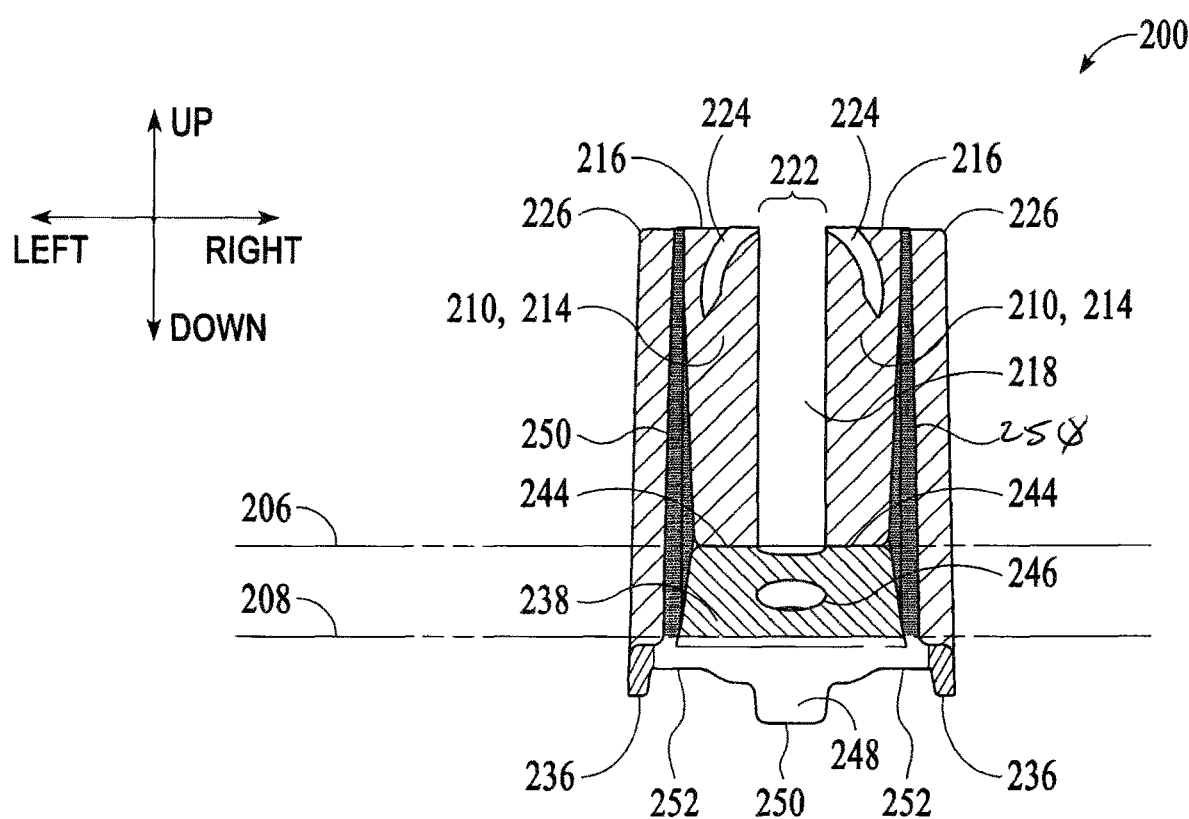
FIG. 3A illustrates a rear view of a vertical interface, in accordance with some embodiments.
Figure 3B:
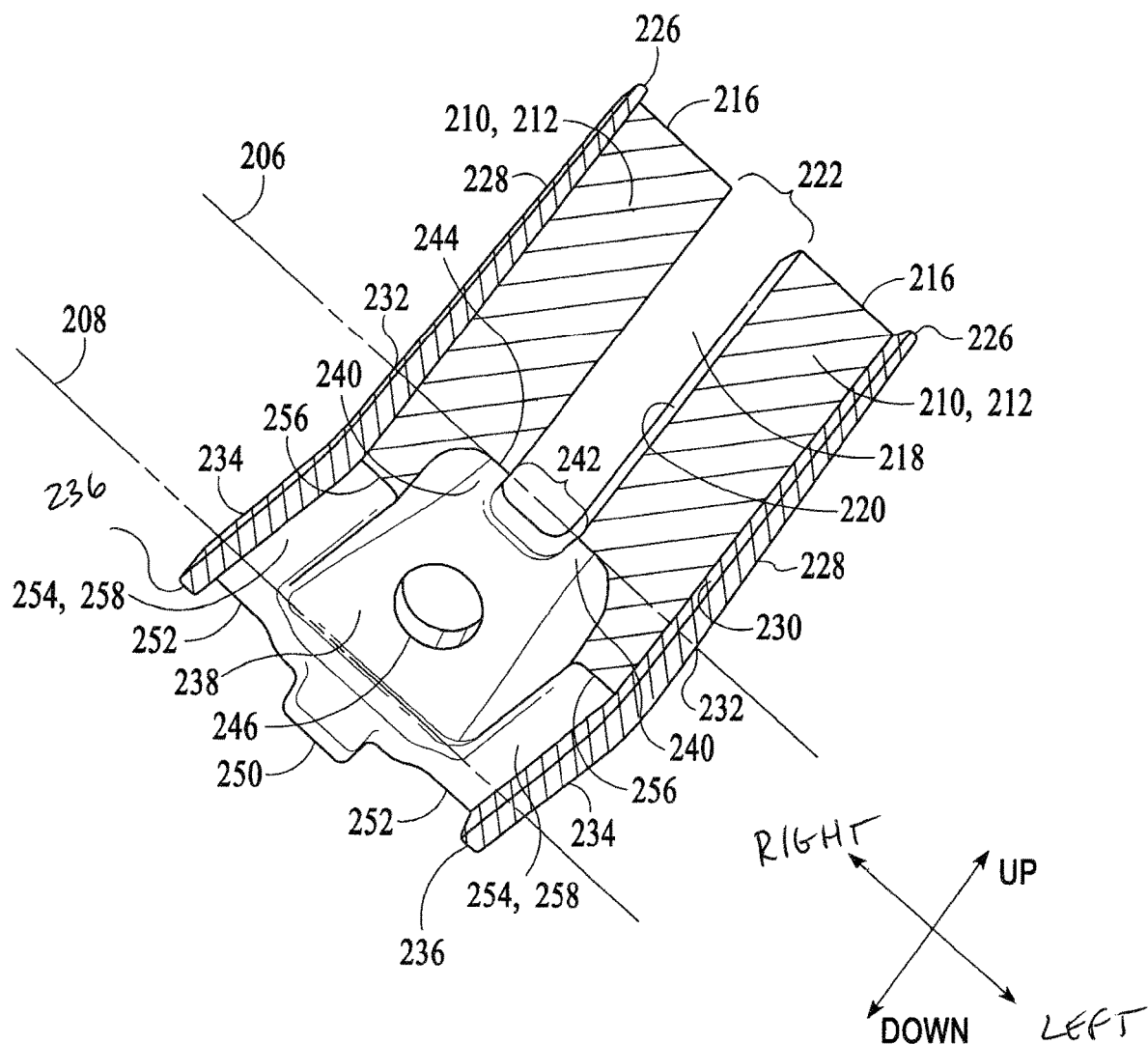
FIG. 3B illustrates a perspective view of the vertical interface, in accordance with some embodiments.
Figure 3C:
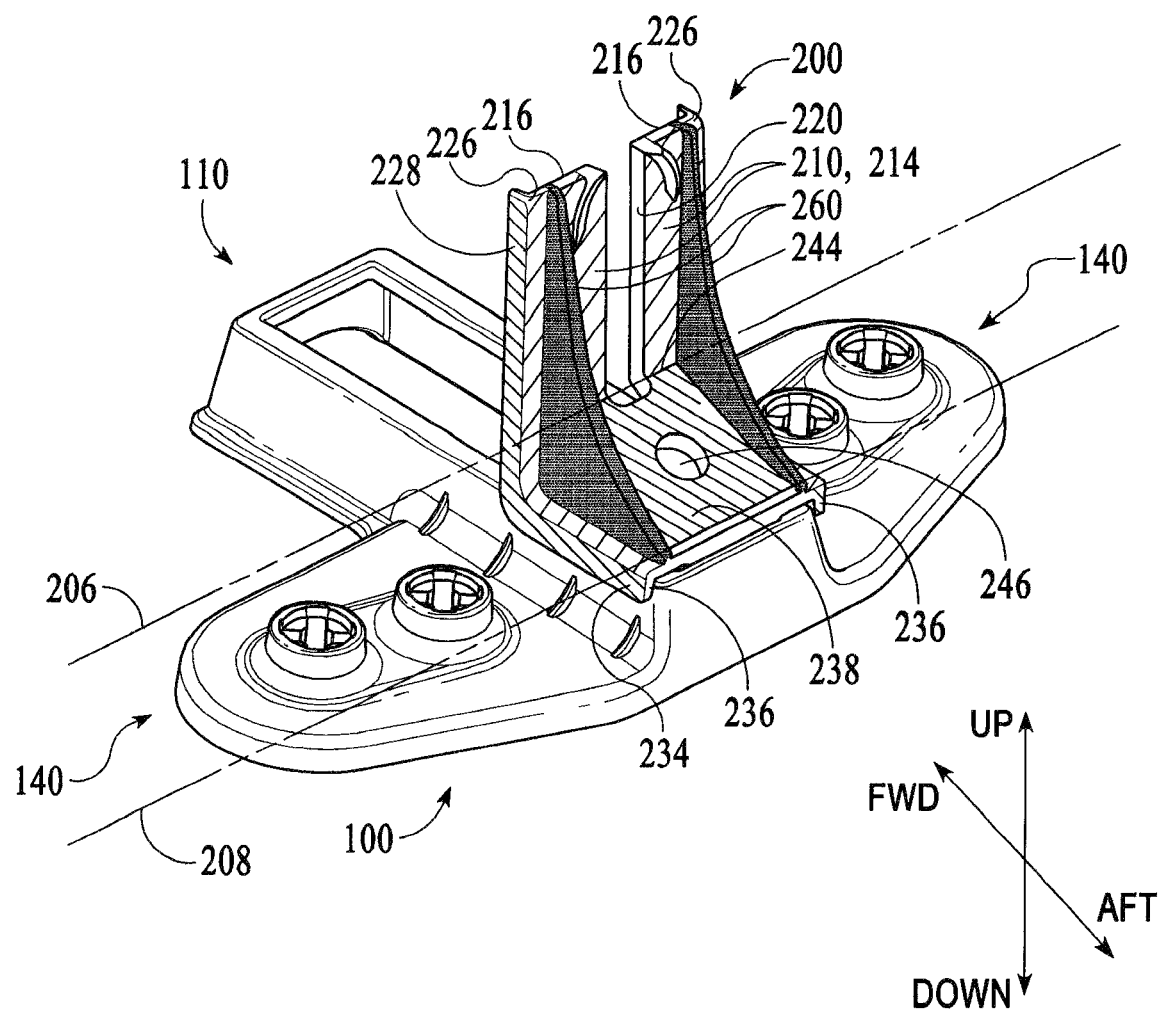
FIGS. 3C-3F illustrate perspective views of the vertical interface coupled to the base, in accordance with some embodiments.
Figure 3D:
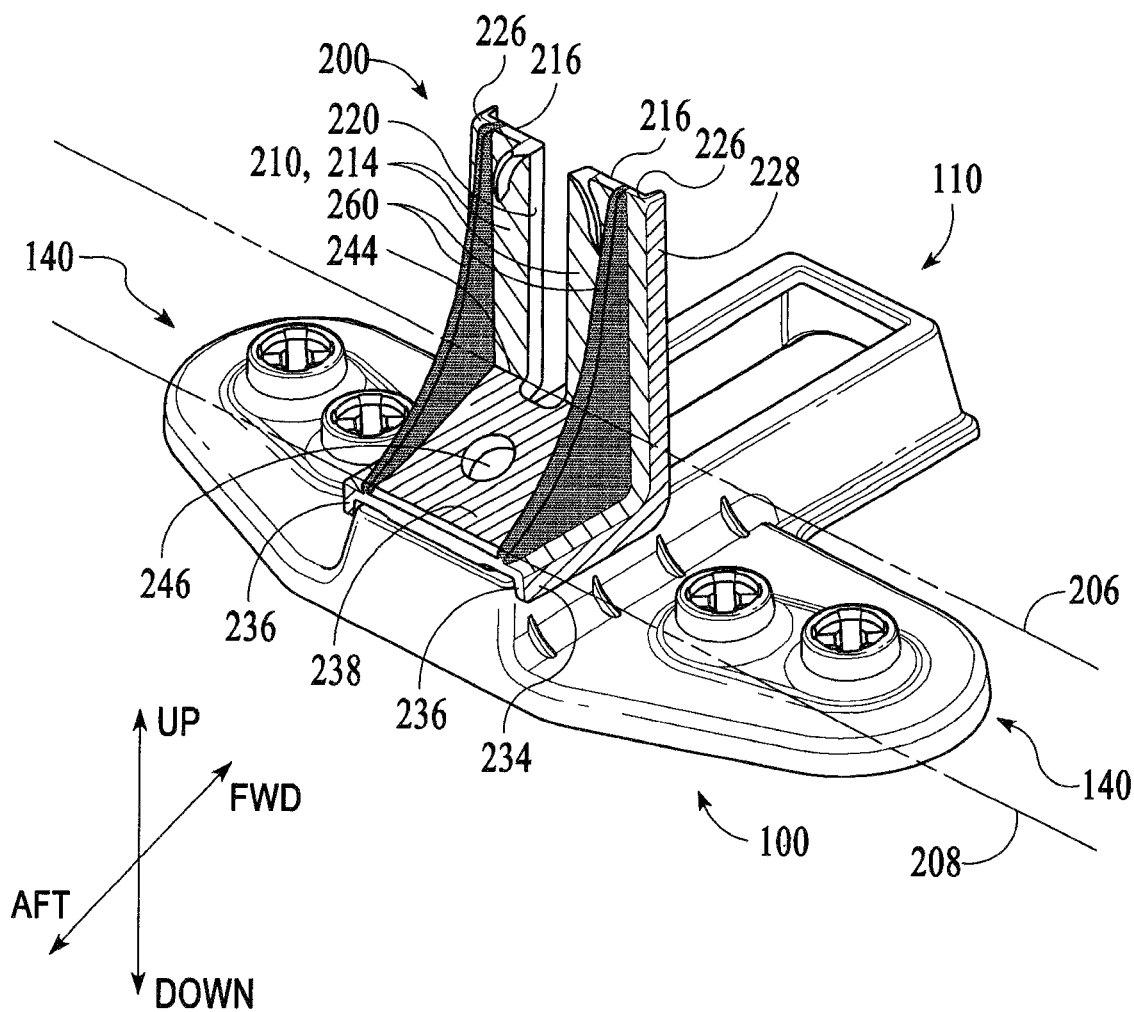
Figure 3E:
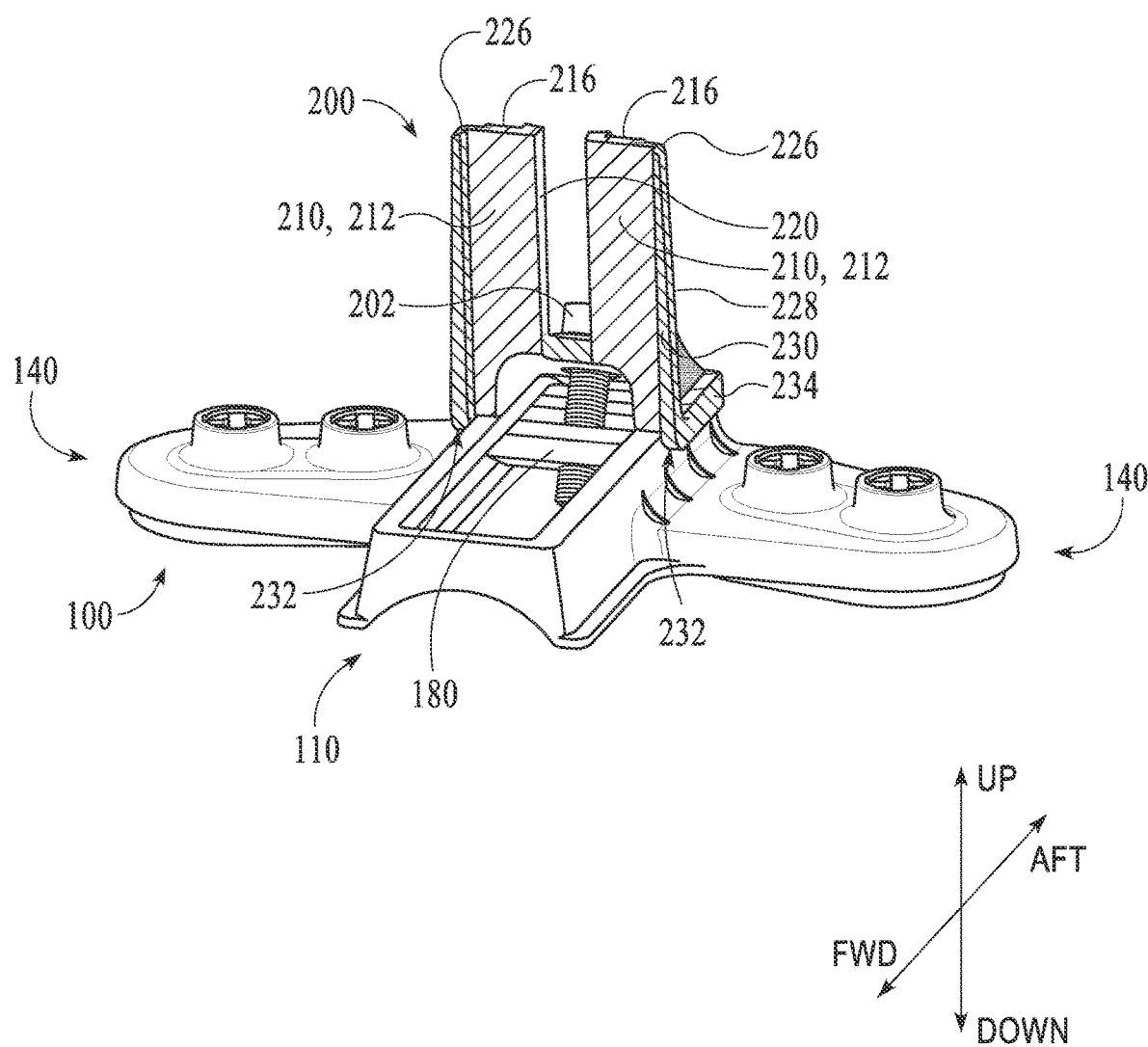
Figure 3F:
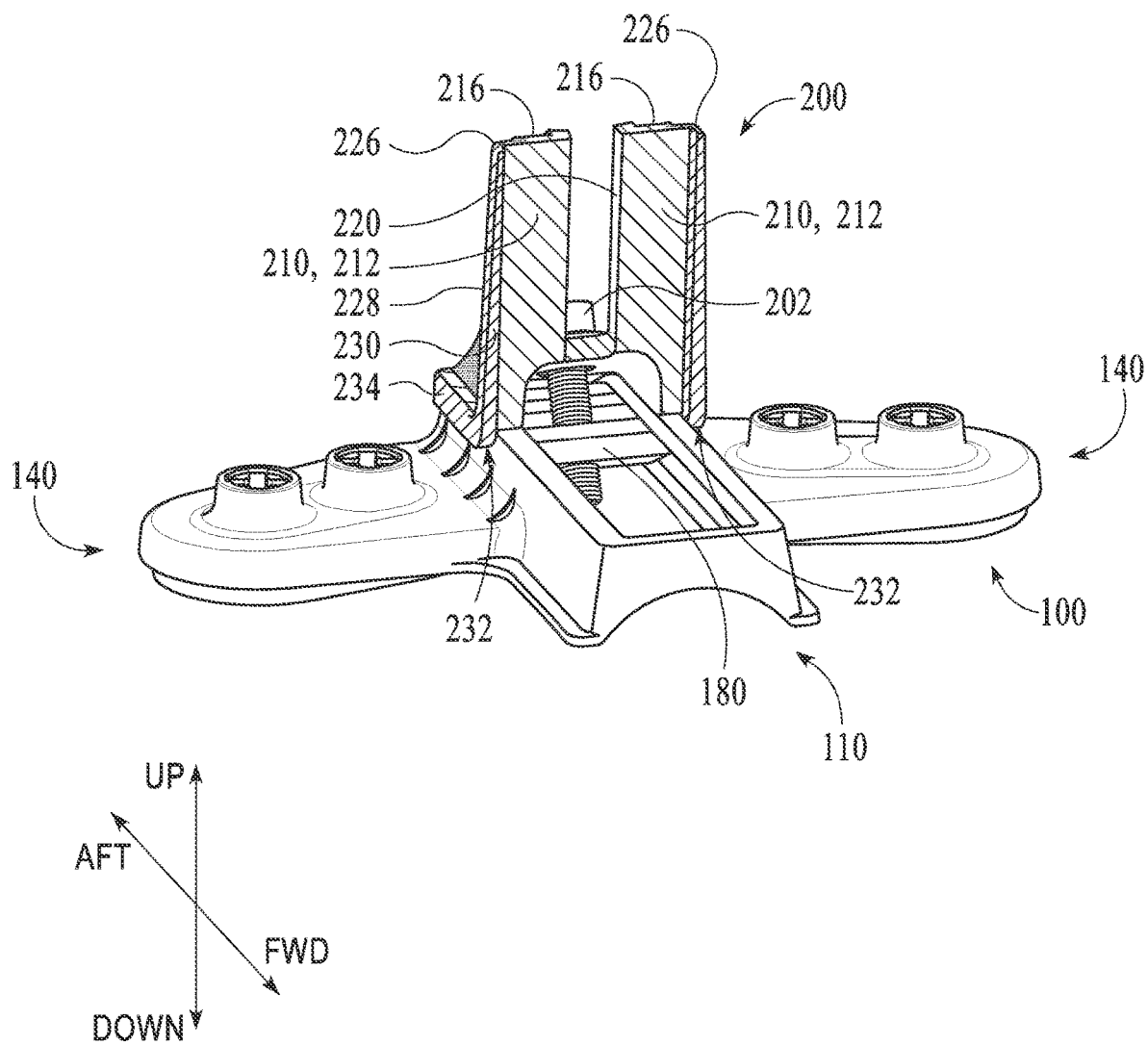

FIG. 3A illustrates a rear view of vertical interface 200; FIG. 3B illustrates a perspective view of vertical interface 200; and FIGS. 3C-3F illustrate perspective views of vertical interface 200 positioned against base 100. Vertical interface 200 may be defined with laterally-extending forward and aft horizontal references 206 and 208, respectively. Vertical interface 200 may include opposing forward vertical members 210 with forward and aft surfaces 212 and 214, respectively, extending upwardly from forward horizontal reference 206 to distal ends 216 and form a vertically-disposed slot 218 between inner surfaces 220 of opposing forward vertical members 210. In some embodiments, slot 218 has an opening 222 between distal ends 216, and/or aft surfaces 214 include stops 224 that place an upper vertical positioning limit of lower member 350 of clamp 300 when secured to vertical interface 200; as shown, stops 224 have a rounded configuration for engaging the round shape of washer 304 which engages aft surface 214 when lower member 350 of clamp 300 is coupled to vertical interface 200. In some embodiments, slot 218 could have a lower end that is closed (not shown) at or above forward horizontal reference 206.

Distal ends 216 of opposing forward vertical members 210 may extend laterally (i.e., left and right) outward from inner surfaces 220 until reaching upper ends 226 from which vertical rails 228 extend substantially perpendicularly and forwardly to forward ends 230; vertical rails 228 also extend downwardly from upper ends 226 to lower ends 232. Horizontal rails 234 may extend rearwardly and horizontally from lower forward ends 232 until reaching aft ends 236. When clamp 300 is being coupled to vertical interface 200, a lower vertical flange 378 of lower member 350 of clamp 300 may be placed between vertical rails 228 and against forward surfaces 212 of opposing forward vertical members 210.

Vertical interface 200 may include an angularly-disposed lower member 238 that extends forwardly and upwardly from aft horizontal reference 208 and divides into opposing members 240 that form an opening 242 and opposing distal ends 244 that intersect opposing forward vertical members 210 at forward horizontal reference 206. Angularly-disposed lower member 238 includes an aperture 246 that, when fastener 202 couples vertical interface 200 to base 100, is concentrically-aligned with aperture 196 of locking nut 180.

In some embodiments, angularly-disposed lower member 238 could include a vertical member 248 with a stop 250 extending downwardly from aft horizontal reference 208 to lower ends 252. When vertical interface 200 is positioned on base 100, stop 250 limits the rearward positioning and/or slidable travel on base 100.

Vertical interface 200 may include opposing lower horizontal members 254 that extend forwardly and horizontally from lower ends 252 to distal ends 256 of opposing forward vertical members 210. When vertical interface 200 is positioned for coupling to base 100, lower surfaces 258 of opposing lower horizontal members 254 may be placed against upper surfaces 132 of upper flanges 130 of rail 110, resulting in horizontal rails 234 being placed outwardly of outer side 120.

Vertical interface 200 may include may include opposing lateral vertical members 250, where each extends rearwardly from aft surface 214 of opposing forward vertical member 210 and upwardly from between angularly-disposed lower member 238 and horizontal rail 234. As shown, the vertical height of each opposing lateral vertical member 250 decreases gradually and continuously as it extends rearwardly from aft surface 214.

Figure 4A:
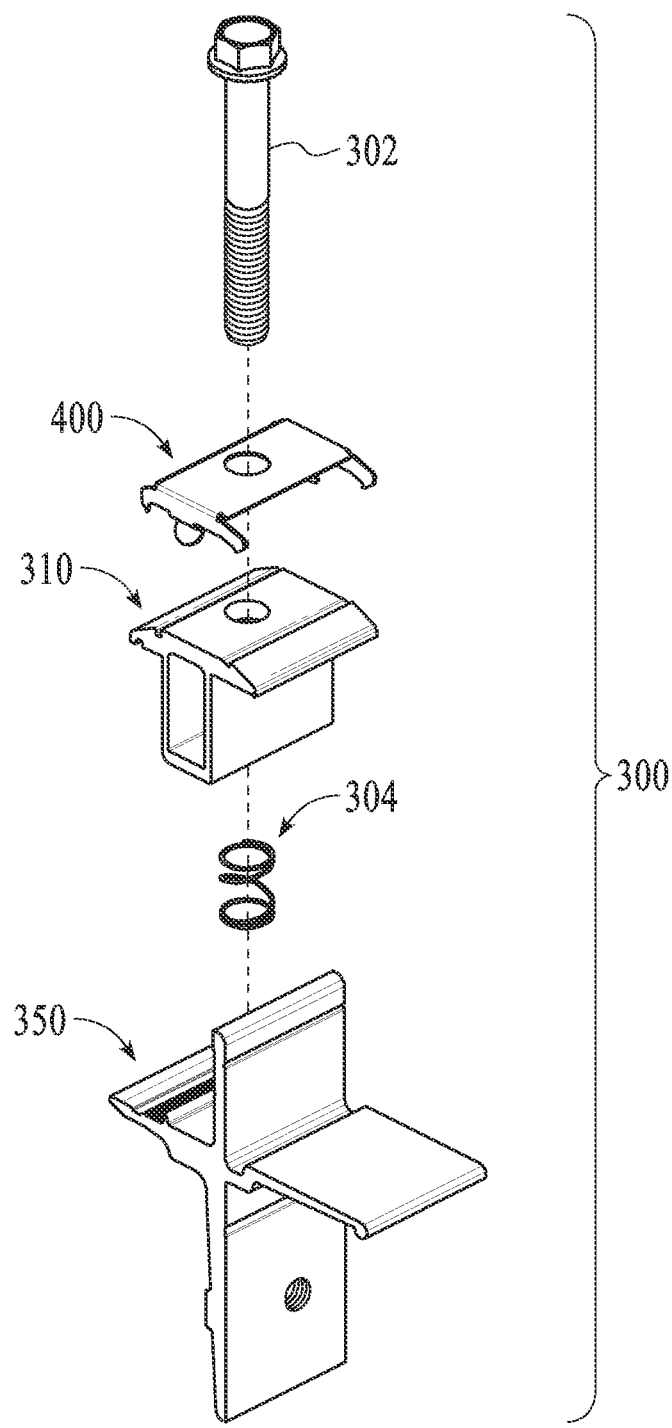
FIG. 4A illustrates an exploded view of a first clamp, in accordance with some embodiments.

FIG. 4A illustrates an exploded view of clamp 300. Clamp 300 includes a fastener 306, spring 308, upper member 310, and lower member 350.

Figure 4B:
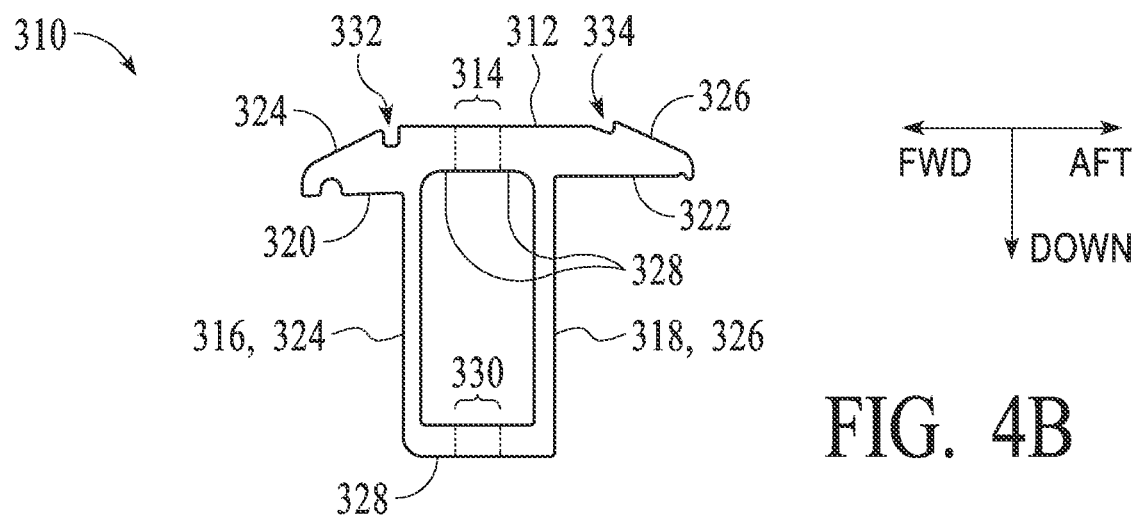
FIGS. 4B-4C illustrate side views of upper and lower members of the first clamp, in accordance with some embodiments.
Figure 4C:
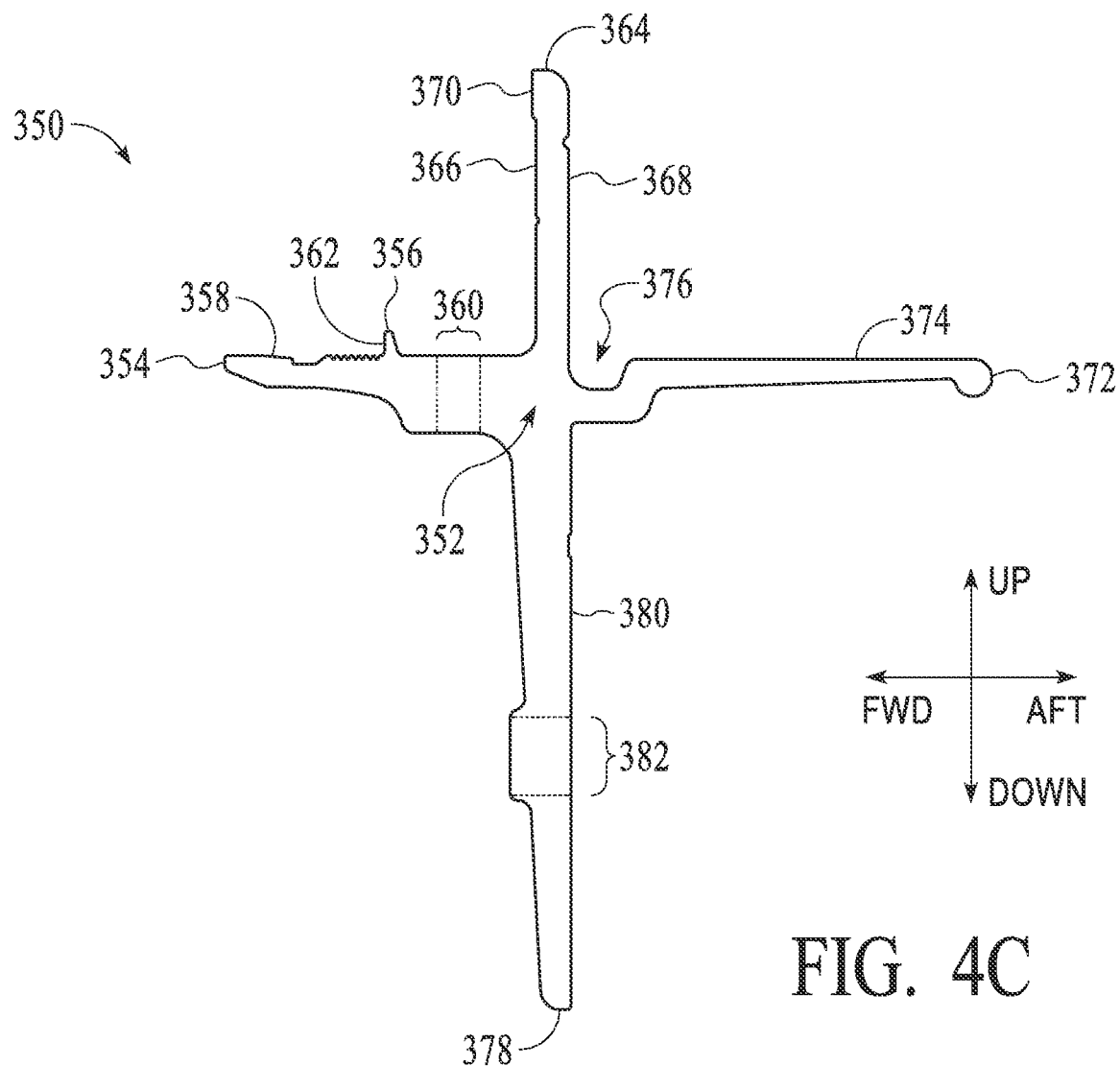

FIGS. 4B-4C illustrate side views of upper and lower members 310 and 350, respectively, of clamp 300. Upper member 310 includes a cap 312 with an aperture 314 through which fastener 308 extends when clamp 300 is secured to module or adjacent modules 40. Vertical members 316 and 318 extend downwardly away from clamping surfaces 320 and 322, respectively, where a user may position an aft surface of module 40 or skirt 60 against a forward surface 324 prior to being engaged by clamping surface 320 when being clamped by 300; similarly, a user may position a second module 40 against an aft surface 326 prior to being engaged by clamping surface 322 when being clamped by 300. A horizontal member 328 extends between distal ends of vertical members 316 and 318 and includes an aperture 330 that, when clamp 300 is employed, is configured for concentrical alignment with aperture 314.

Lower member 350 includes a center portion 352 and a forward horizontal flange 354 extending forwardly away from center portion 352. Forward horizontal flange 354 includes a lip 356 extending upwardly away from an upper surface 358 and an aperture 360 that, when clamp 300 is employed, is configured for concentrical alignment with apertures 314 and 330.

When clamp 300 is employed, forward horizontal flange 354 provides a clamping surface opposing clamping surface 320 of upper member 310. Lower and aft surfaces of module 40 are positioned on upper surface 358 and against a forward surface 362 of lip 356, respectively. In some embodiments, aperture 360 and fastener 306 are threaded to facilitate a threadable engagement between the complementary threads when clamp 300 is employed.

Lower member 350 includes an upper vertical flange 364 extending upwardly away from center portion 352 and having forward and aft surfaces 366 and 368, respectively. When clamp 300 is employed, forward surface 366 is configured to engage an aft vertical surface 326 of vertical member 318. In some embodiments, a distal end of upper vertical flange includes a lip 370 extending forwardly that, when present, will slidably engage aft vertical surface 326 when module 40 is placed between upper and lower members 310 and 350, respectively.

Lower member 350 includes an aft horizontal flange 372 that opposes forward horizontal flange 354 and extends rearwardly in an aft direction from center portion 352. When employed, aft horizontal flange 372 provides a clamping surface opposing clamping surface 322 of upper member 310.

As observed, aft horizontal flange 372 is coplanar with forward horizontal flange 354 and longer than clamping surface 322 that is rearward of vertical member 318; the increase in length (or distance) allows a user to slide a bottom side of a second module 40 forwardly against an upper surface 374 of aft horizontal flange 372 when the first module 40 has already been secured by clamp 300. Upper surface 374 includes a notch 376 at an intersection of upper vertical flange 364 to assist the user when securing the second module 40 to clamp 300 between clamping surface 322 and aft horizontal flange 372.

Lower member 350 includes a lower vertical flange 378 that opposes upper vertical flange 364 and extends downwardly away from center portion 352. Lower vertical flange 378 includes an aft surface 380 and an aperture 382 into which fastener 302 is received after being positioned within slot 218 of vertical interface 200.

When clamp 300 is secured to vertical interface 200, aft surface 380 engages forward surfaces of opposing vertical members 218. In some embodiments, aperture 380 and fastener 302 are threaded to facilitate a threadable engagement between the complementary threads to secure at least lower member 350 to vertical interface 200.

Figure 4D:
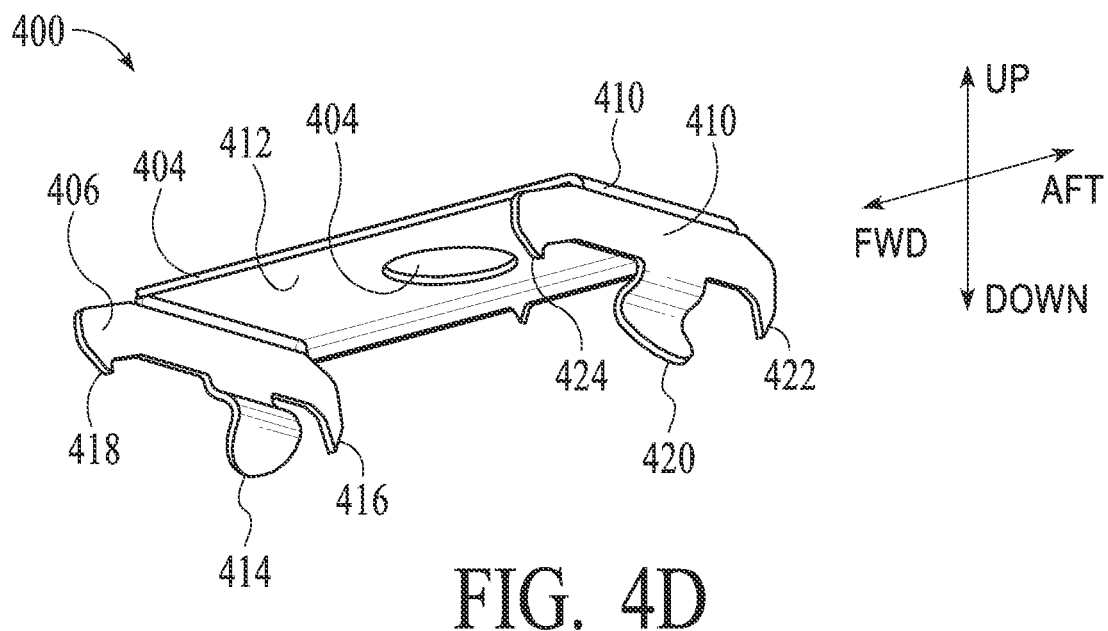
FIGS. 4D-4E illustrate perspective and top views of a grounding clip of the first clamp, in accordance with some embodiments.
Figure 4E:
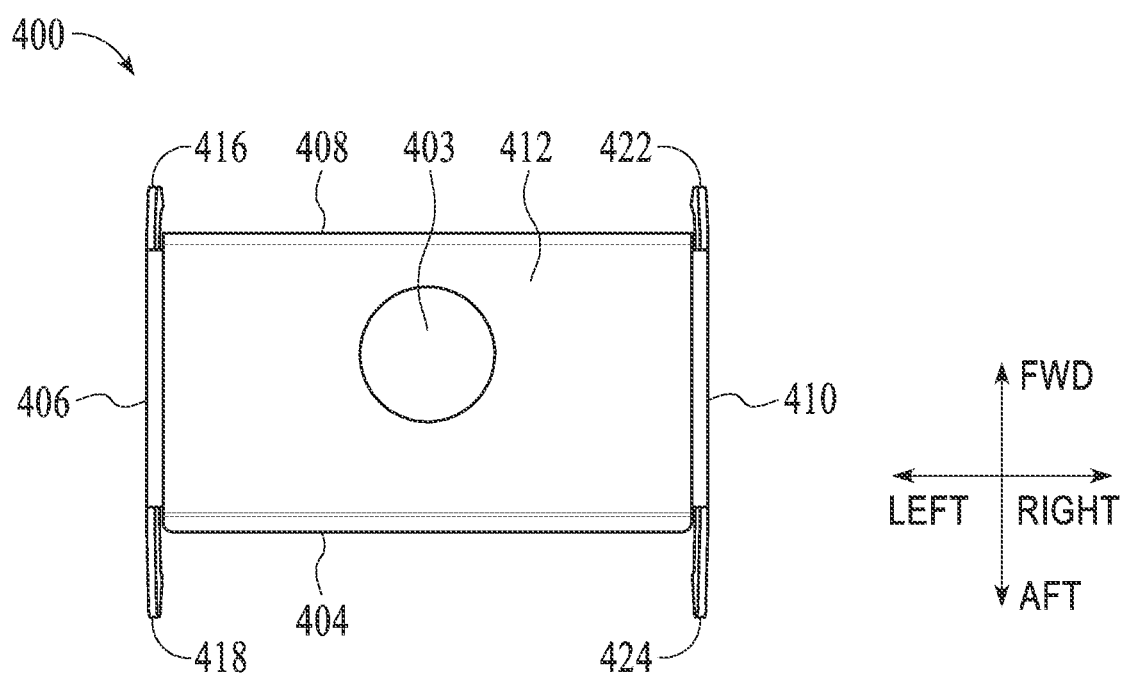

FIGS. 4D-4E illustrate perspective and top views, respectively, of grounding clip 400. Grounding clip 400 includes a main body 402 with an aperture 404 through which fastener 306 is inserted when clamp 300 is ready to be secured to module 40. Grounding clip 400 includes aft, left, forward, and right sides 406, 408, 410, and 412, respectively. Left side 408 extends downward from a lower surface 414 of main body 402 and includes a spring tab 416 located between tines 418 and 420 at its forward and aft distal ends, respectively. Similarly, right side 412 extends downward from lower surface 414 and includes a spring tab 422 between tines 424 and 426 at its forward and aft distal ends, respectively.

As grounding clip 400 is placed against upper surface 332 of cap 312, spring tabs 416 and 420 snap into place between vertical sides 316 and 318 and held against lower surface 328. When upper member 310 and lower member 350 are compressively clamped to module 40 by a tightening force applied fastener 306, compression spring 308 is compressed, and tines 418, 420, 424, and 426 pierce an upper surface of module 40.

Figure 5A:
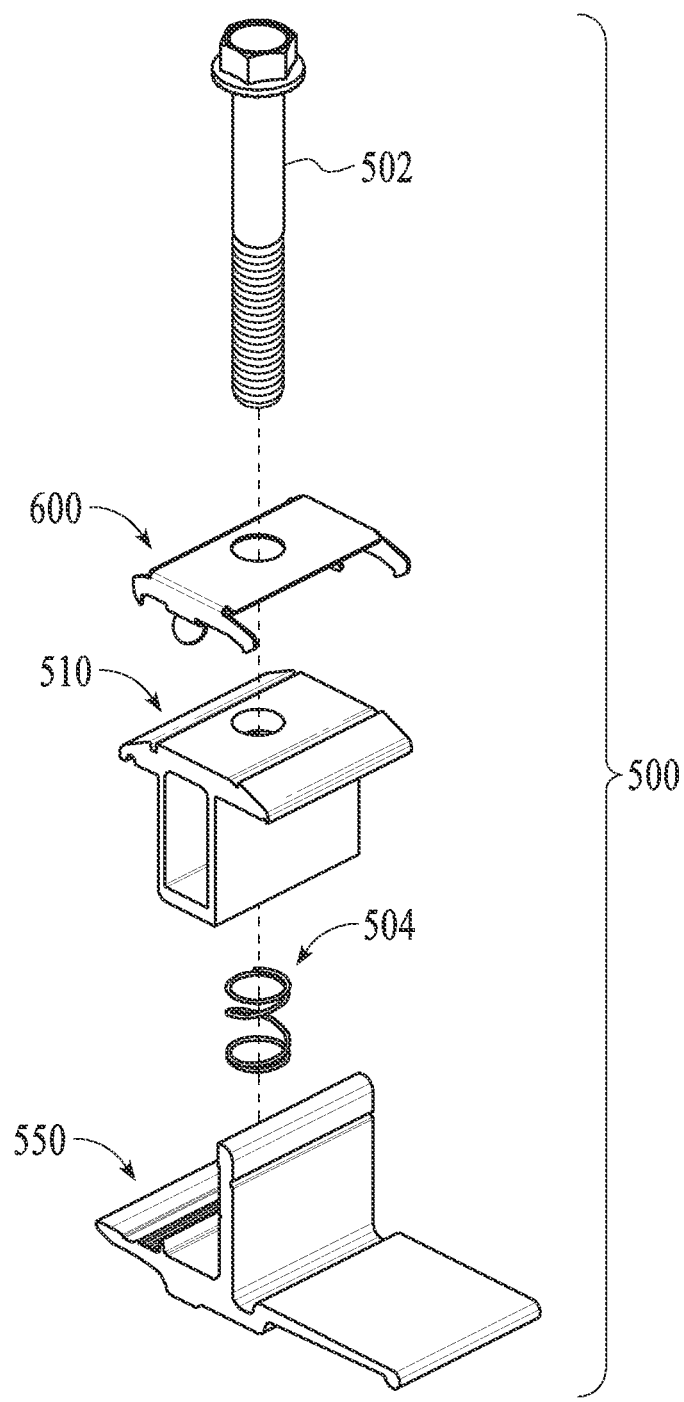
FIG. 5A illustrates an exploded view of a second clamp, in accordance with some embodiments.

FIG. 5A illustrates an exploded view of clamp 500. Clamp 500 includes a fastener 502, spring 504, upper member 510, and lower member 550.

Figure 5B:
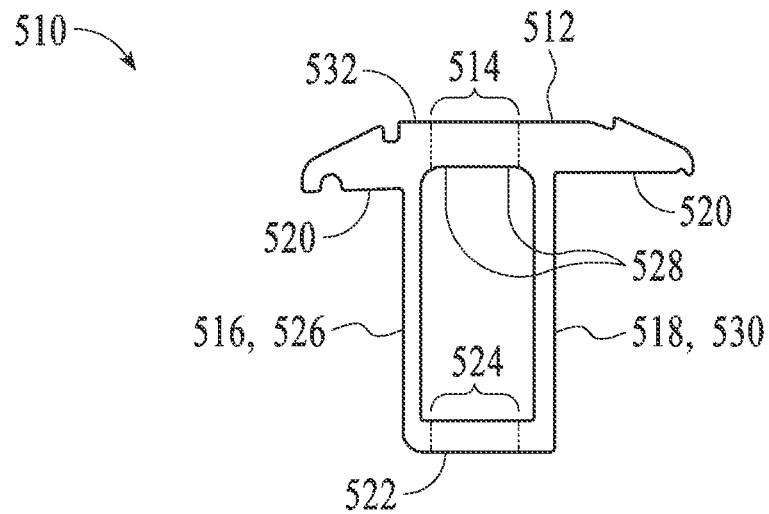
FIGS. 5B-5C illustrate side views of upper and lower members of the second clamp, in accordance with some embodiments.
Figure 5C:
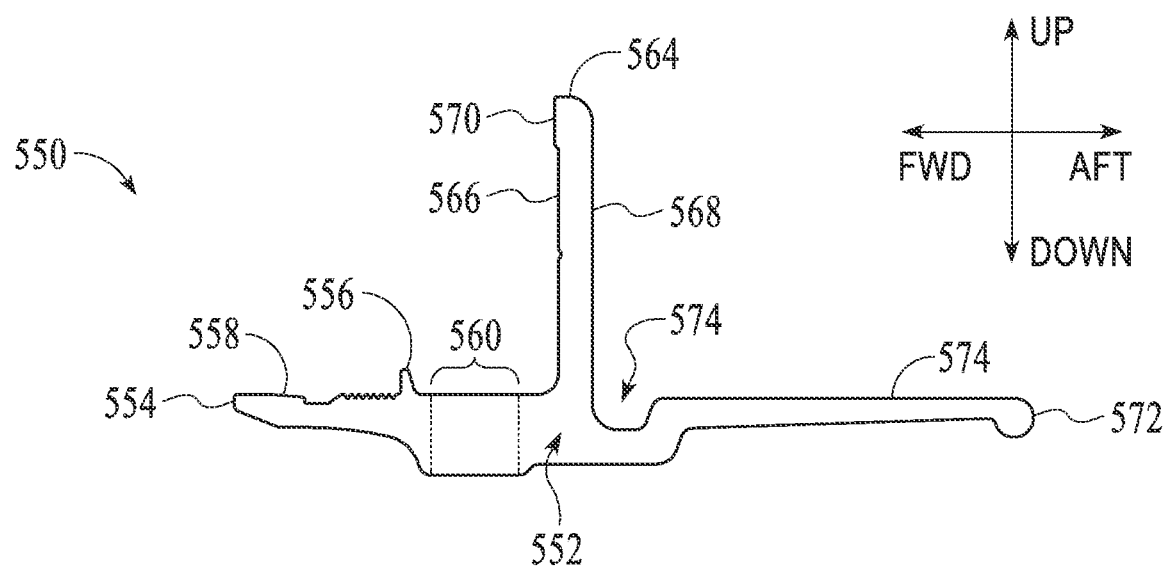

FIGS. 5B-5C illustrate side views of upper and lower members 510 and 550, respectively, of clamp 500. Upper member 510 includes a cap 512 with an aperture 514 through which fastener 502 extends when clamp 500 is secured to module 40 or adjacent skirts 60. Vertical members 516 and 518 extend downwardly away from a lower surface 520 of cap 512, where a user may position module 40 or adjacent skirts 60 against a forward surface 526 prior to them being clamped by 500. A horizontal member 522 extends between distal ends of vertical members 516 and 518 and includes an aperture 524 that, when clamp 500 is employed, is configured for concentrical alignment with aperture 514.

When clamp 500 is employed, an aft surface of module 40 may be positioned against forward surface 526 of vertical member 516. In some embodiments, forward surface 526 is flat to engage a flat surface of module 40. Cap 512 includes a lower surface 528 between vertical members 516 and 518 that is configured to engage spring tabs 514 and 520 of ground clip 600.

Lower member 550 includes a center portion 552 and a forward horizontal flange 554 extending forwardly away from center portion 552. Forward horizontal flange 554 includes a lip 556 extending upwardly away from an upper surface 558; forward horizontal flange 554 also includes an aperture 560 that, when clamp 500 is employed, is configured for concentrical alignment with apertures 514 and 524. When clamp 500 is employed, lower and aft surfaces of module 40 are positioned on upper surface 558 and against a forward surface 562 of lip 556, respectively. In some embodiments, aperture 560 and fastener 502 are threaded to facilitate a threadable engagement between the complementary threads when clamp 500 is employed.

Lower member 550 includes an upper vertical flange 564 extending upwardly away from center portion 552 and having forward and aft surfaces 566 and 568, respectively. When clamp 500 is employed, forward surface 566 is configured to engage an aft vertical surface 530 of vertical member 518. In some embodiments, a distal end of upper vertical flange includes a lip 570 extending forwardly that, when present, will slidably engage aft vertical surface 500.

Lower member 550 includes an aft horizontal flange 572 that opposes forward horizontal flange 554 and extends rearwardly away in an aft direction from center portion 552. As observed, aft horizontal flange 572 is coplanar with forward horizontal flange 554 and longer than a portion of cap 512 that is rearward of vertical member 518; the increase in length (or distance) allows a user to slide a bottom side of a second module 40 forwardly against an upper surface 574 of aft horizontal flange 572 when the first module 40 has already been secured by clamp 500. Upper surface 574 includes a notch 576 at an intersection of upper vertical flange 564 to assist the user when securing the second module 40 to clamp 500.

Lower member 550 includes a lower vertical flange 578 that opposes upper vertical flange 564 and extends downwardly away from center portion 552. Lower vertical flange 578 includes an aperture 580 into which fastener 502 is received after being positioned within slot 220 of vertical interface 200. In some embodiments, aperture 580 and fastener 502 are threaded to facilitate a threadable engagement between the complementary threads to secure at least lower member 550 to vertical interface 200.

Figure 5D:
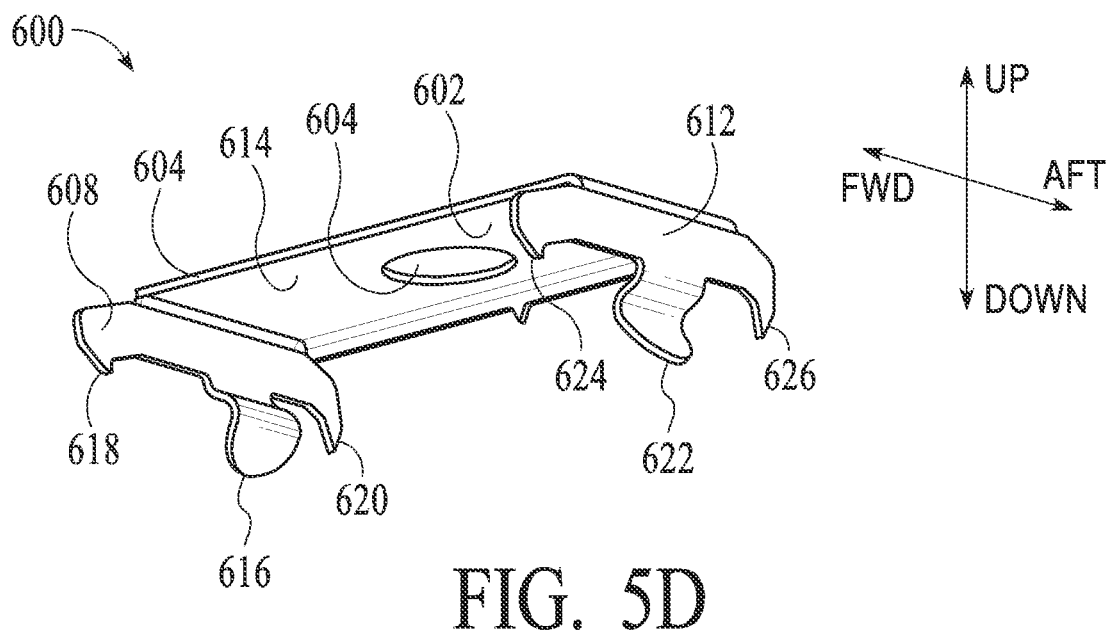
FIGS. 5D-5E illustrate perspective and top views of a grounding clip of the second clamp, in accordance with some embodiments.
Figure 5E:
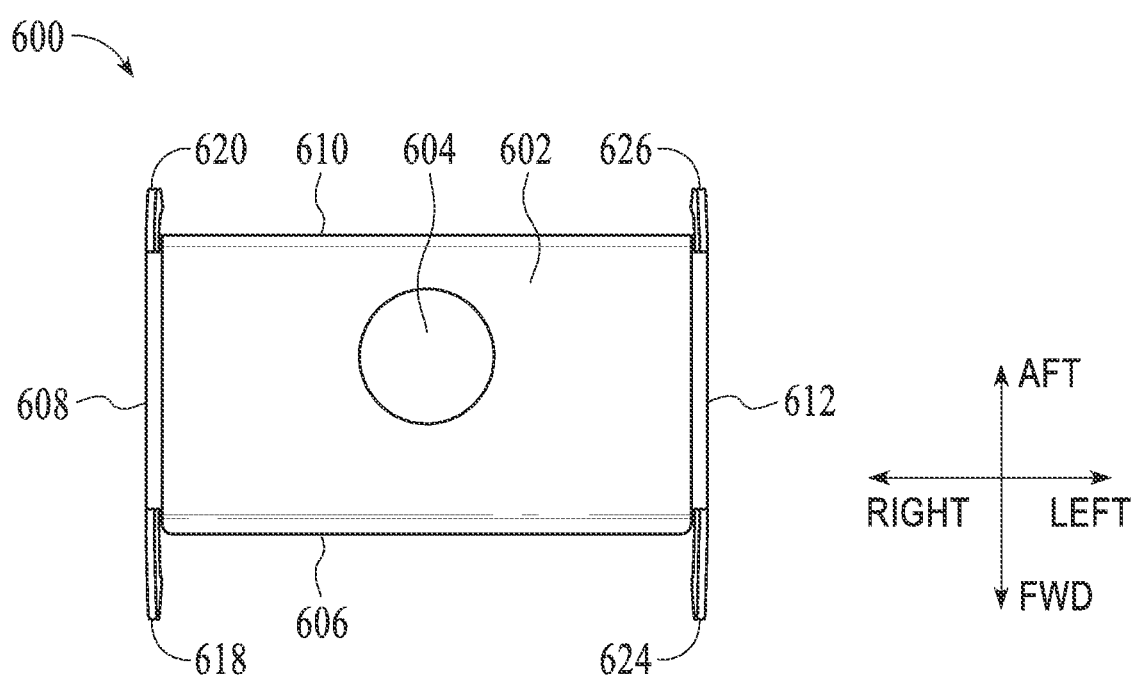

FIGS. 5D-5E illustrate perspective and top views, respectively, of grounding clip 600. Grounding clip 600 includes a main body 602 with an aperture 604 through which fastener 502 is inserted when clamp 500 is ready to be secured to module 40. Grounding clip 600 includes aft, left, forward, and right sides 606, 608, 610, and 612, respectively. Left side 608 extends downward from a lower surface 614 of main body 602 and includes a spring tab 616 located between tines 618 and 620 at its forward and aft distal ends, respectively. Similarly, right side 612 extends downward from lower surface 614 and includes a spring tab 622 between tines 624 and 626 at its forward and aft distal ends, respectively.

As grounding clip 600 is placed against upper surface 532 of cap 512, spring tabs 616 and 620 snap into place between vertical sides 516 and 518 and held against lower surface 528. When upper member 510 and lower member 550 are compressively clamped to module 40 by a tightening force applied fastener 306, compression spring 308 is compressed, and tines 618, 620, 624, and 626 pierce an upper surface of module 40.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A mount assembly, comprising:
    a rail and a pair of opposing wings, where
        the rail includes:
            a pair of first opposing sides, and
            a pair of second opposing sides; and
        each wing of the pair of opposing wings extends outwardly from one first opposing side, and
        each wing of the pair of opposing wings includes:
            a top surface and a bottom surface, and
            at least one aperture fastener-receiving aperture;
        wherein each wing of the pair of opposing wings further includes at least one fastener retainer extending above one aperture of the plurality of apertures, wherein each one of the at least one fastener retainer includes a plurality of fastener retainer flaps supported by a plurality of vertical guides extending between the plurality of fastener retainer flaps and the one aperture.

2. The mount assembly of claim 1, wherein the rail further includes a cross member extending between the pair of opposing wings.

3. The mount assembly of claim 2, wherein the cross member in slidable within the rail.

4. The mount assembly of claim 3, wherein the cross member includes an aperture.

5. The mount assembly of claim 4, wherein the aperture is threaded.

6. The mount assembly of claim 1, wherein
each wing of the pair of opposing wings further includes:
    a groove extending away the bottom surface and upwardly into the wing,
    a sealant-receiving cavity extending away the bottom surface and upwardly into the wing, and
    a compressible seal with a circumferential pressure relief passageway, where
        the compressible seal is disposed within the groove and extends downwardly beyond the bottom surface, and
        at least one aperture extending upwardly from the sealant-receiving cavity to the top surface.

7. The mount assembly of claim 1, wherein
the plurality of fastener retainer flaps is configured to engage threads of a fastener when the fastener is inserted into the fastener retainer and positioned between the plurality of vertical guides, such that
    the plurality of fastener retainer flaps facilitates a prepositioning of the fastener vertically and statically between the plurality of vertical guides prior to the mount assembly being positioned on the installation surface for mounting thereon.

8. The mount assembly of claim 7, further comprising:
a plurality of fasteners, where
    the plurality of fasteners is configured to engage an installation surface when the mount assembly is mounted to the installation surface, such that
        each fastener of the plurality of fasteners extends through one fastener retainer and one aperture.

9. The mount assembly of claim 1, further comprising:
a vertical interface configured to couple to the rail.

10. The mount assembly of claim 9, further comprising:
a clamp configured to couple to the vertical interface.

11. The mount assembly of claim 10, wherein the clamp is configured to clamp to at least one solar module.

* * * * *